United States Patent
Su et al.

(10) Patent No.: US 11,321,317 B2
(45) Date of Patent: *May 3, 2022

(54) LEVERAGING QUERY-SPECIFIC STATISTICS IN NON-EQUIVALENT QUERIES

(71) Applicant: Oracle International Corporation, Redwood Shores, CA (US)

(72) Inventors: Hong Su, Foster City, CA (US); Sunil P. Chakkappen, Foster City, CA (US); Mohamed Zait, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 568 days.

This patent is subject to a terminal disclaimer.

(21) Appl. No.: 15/666,380

(22) Filed: Aug. 1, 2017

(65) Prior Publication Data
US 2017/0357692 A1 Dec. 14, 2017

Related U.S. Application Data

(63) Continuation of application No. 14/041,952, filed on Sep. 30, 2013, now Pat. No. 9,727,609.
(Continued)

(51) Int. Cl.
*G06F 16/2453* (2019.01)
(52) U.S. Cl.
CPC .. *G06F 16/24544* (2019.01); *G06F 16/24542* (2019.01)
(58) Field of Classification Search
CPC .................. G06F 16/24542; G06F 16/24544
See application file for complete search history.

(56) References Cited

U.S. PATENT DOCUMENTS 5,301,317 A * 4/1994 Lohman ............ G06F 16/24547
6,353,826 B1 3/2002 Seputis
(Continued)

OTHER PUBLICATIONS

U.S. Appl. No. 14/041,750, filed Sep. 30, 2013, Office Action, dated Mar. 24, 2016.
(Continued)

*Primary Examiner* — Apu M Mofiz
*Assistant Examiner* — Dara J Glasser
(74) *Attorney, Agent, or Firm* — Hickman Becker Bingham Ledesma LLP

(57) ABSTRACT

Techniques for processing queries are provided. In one approach, an execution plan for a query includes multiple sub-plans, one or more of which are selected at runtime while one or more other sub-plans are not executed during execution of the execution plan. In another approach, data about misestimate is generated and stored persistently for subsequent queries. In another approach, statistics for a database object are generated automatically and efficiently while the database object is created or data items are added thereto. In another approach, a hybrid histogram is created that includes a feature of frequency histograms and a feature of height-balanced histograms. In another approach, computer jobs are executed in such a way to avoid deadlock. In another approach, changes to a database object trigger a hard parse of a query even though an execution plan already exists for the query.

16 Claims, 10 Drawing Sheets

Related U.S. Application Data

(60) Provisional application No. 61/786,443, filed on Mar. 15, 2013, provisional application No. 61/707,849, filed on Sep. 28, 2012.

(56) References Cited

U.S. PATENT DOCUMENTS

| | | | |
|---|---|---|---|
| 6,366,901 | B1 | 4/2002 | Ellis |
| 6,434,545 | B1* | 8/2002 | MacLeod .............. G06F 16/217 |
| 6,615,206 | B1 | 9/2003 | Jakobsson et al. |
| 7,849,032 | B1 | 12/2010 | Campos et al. |
| 8,434,075 | B1 | 4/2013 | Brown |
| 9,262,477 | B1 | 2/2016 | Gu |
| 2004/0210563 | A1* | 10/2004 | Zait ......................... G06F 16/22 |
| 2004/0243555 | A1 | 12/2004 | Bolsius et al. |
| 2005/0097078 | A1 | 5/2005 | Lohman et al. |
| 2005/0125452 | A1* | 6/2005 | Ziauddin .............. G06F 16/217 |
| 2005/0131879 | A1* | 6/2005 | Ghosh ............... G06F 16/24532 |
| 2005/0177557 | A1 | 8/2005 | Ziauddin |
| 2005/0223026 | A1* | 10/2005 | Chaudhuri ............ G06F 16/217 |
| 2005/0267866 | A1 | 12/2005 | Markl |
| 2006/0004695 | A1* | 1/2006 | Day .................. G06F 16/24542 |
| 2006/0031189 | A1 | 2/2006 | Muras |
| 2006/0074874 | A1 | 4/2006 | Day et al. |
| 2006/0136396 | A1 | 6/2006 | Brobst |
| 2009/0037402 | A1 | 2/2009 | Lee et al. |
| 2009/0037405 | A1 | 2/2009 | Lee |
| 2009/0106219 | A1 | 4/2009 | Belknap |
| 2010/0153431 | A1* | 6/2010 | Burger ................ G06F 16/2433 707/769 |
| 2010/0306188 | A1 | 12/2010 | Cunningham et al. |
| 2013/0262435 | A1 | 10/2013 | Bossman et al. |
| 2014/0046928 | A1 | 2/2014 | Konik et al. |
| 2020/0125545 | A1 | 4/2020 | Idicula |

OTHER PUBLICATIONS

Su, U.S. Appl. No. 14/041,952, filed Sep. 30, 2013, Advisory Action, dated Mar. 14, 2017.
Su, U.S. Appl. No. 14/041,952, filed Sep. 30, 2013, Final Office Action, dated Dec. 27, 2016.
Su, U.S. Appl. No. 14/041,952, filed Sep, 30, 2013, Notice of Allowance, dated Apr. 5, 2017.
U.S. Appl. No. 14/041,750, filed Sep. 30, 2013, Final Office Action, dated Jun. 14, 2016.
U.S. Appl. No. 14/041,750, filed Sep. 30, 2013, Final Office Action, dated Oct. 30, 2015.
Lee, U.S. Appl. No. 14/041,750, filed Sep. 30, 2013, Notice of Allowance, dated Mar. 27, 2017.
U.S. Appl. No. 14/041,750, filed Sep. 30, 2013, Office Action, dated Sep. 3, 2015.
U.S. Appl. No. 14/041,952, filed Sep. 30, 2013, Office Action, dated Aug. 12, 2015.
U.S. Appl. No. 14/041,884, filed Sep. 30, 2013, Final Office Action, dated Dec. 15, 2015.
U.S. Appl. No. 14/041,884, filed Sep. 30, 2013, Notice of Allowance, dated Jun. 7, 2016.
U.S. Appl. No. 14/041,884, filed Sep. 30, 2013, Office Action, dated Oct. 7, 2015.
U.S. Appl. No. 14/041,884, filed Sep. 30, 2013, Restriction Requirement, dated Aug. 18, 2015.
U.S. Appl. No. 14/041,952, filed Sep. 3, 2013, Final Office Action, dated Feb. 2, 2016.
U.S. Appl. No. 14/041,952, filed Sep. 30, 2013, Office Action, dated Jun. 16, 2016.
PostgreSQL 9.0, "Analyze", https://www.postgresql.org/docs/9.0/sql-analyze.html, last viewed on Jun. 29, 2020, 2 pages.
Oracle8i interMedia Text Reference Release 2 (8.1.6), "Optimizing Queries with Statistics", https://docs.oracle.com/cd/A87860_01/doc/inter.817/a77063/aoptim2, last viewed on Jun. 29, 2020, 3 pages.
Oracle® Database Performance Tuning Guide, "13 Managing Optimizer Statistics", https://docs.oracle.com/cd/E25054_01/server.1111/e16638/stats, last viewed on Jun. 29, 2020, 30 pages.
Oracle, "Database Performance Tuning Guide", 13 Managing Optimizer Statistics, https://docs.oracle.com/cd/B28359_01/server.111/b28274/stats.htm#PFGRF003, last viewed on Jun. 29, 2020, 27 pages.
Oracle Help Center, "Database Performance Tuning Guide", Oracle Database Online Documentation Release 1 (11.1), https://docs.oracle.com/cd/B28359_01/server.111/b28274/stats.htm, dated Jun. 29, 2020, 2 pgs.
MYSQL, "8.3.7 InnoDB and MyISAM Index Statistics Collection", https://dev.mysql.com/doc/refman/5.7/en/index-statistics, last viewed on Jun. 29, 2020, 3 pages.
MY SQL, "14.8.11.1 Configuring Persistent Optimizer Statistics Parameters", ;https://dev.mysql.com/doc/refman/5.6/en/innodb-persistent-stats.html, last viewed on Jun. 29, 2020, 11 pages.
MY SQL, "13.7.2.1 Analyze Table Statement", https://dev.mysql.com/doc/refman/5.6/en/analyze-table.html, last viewed on Jun. 29, 2020, 3 pages.
Microsoft, "Update Statistics", https://docs.microsoft.com/en-us/sql/t-sql/statements/update-statistics-transact-sql?view=sql-server-ver15, last viewed on Jun. 29, 2020, 10 pages.
Kabra et al., "Efficient Mid-Query Re-Optimization of Sub-Optimal Query Execution Plans", AMC, dated 1998, 12 pages.
IBM MQ, "Analyze Command", IBM Insights, www.ibm.com/support/knowledgecenter/SSPT3X_4.2.0/com.ibm.swg.im.infosphere.biginsights.commsql.doc/doc/bsql_analyze, last viewed on Jun. 29, 2020, 9 pgs.
IBM Community Home, "Where am I", https://community.ibm.com/community/user/legacy?lang=en, last viewed on Jun. 29, 2020, 4 pages.
Heule et al., "HyperLogLog in Practice: Algorithmic Engineering of a State of The Cardinality Estimation Algorithm", EDBT/ICDT '13 Mar. 18-22, 2013, Genoa, Italy, 10 pages.
Flajolet et al., "HyperLogLog: the analysis of a near-optimal cardinality estimation algorithm", dated 2007 Discrete Mathematics and Theoretical Computer Science (DMTCS), 21 pages.
Kabra et al., "Efficient Mid-Query Re-Optimization of Sub-Optimal Query Execution Plans", Sigmond, dated 1998, 12 pages.
Deshpande et al., "Adaptive Query Processing", Foundations and Trends in Databases, vol. 1 No. 1, dated 2007, 140 pages.
Zhou et al., "Database Meets AI: A Survey", IEEE Transactions on Knowledge and Data Engineering, https://ieeexplore.ieee.org/document/9094012>, May 2020, 20 pages.
Wikipedia, "Statistic", https_://en_.wikipedia_.org/w/index.php?title=Statistic&oldid=960557939, Jun. 2020, 4 pages.

* cited by examiner

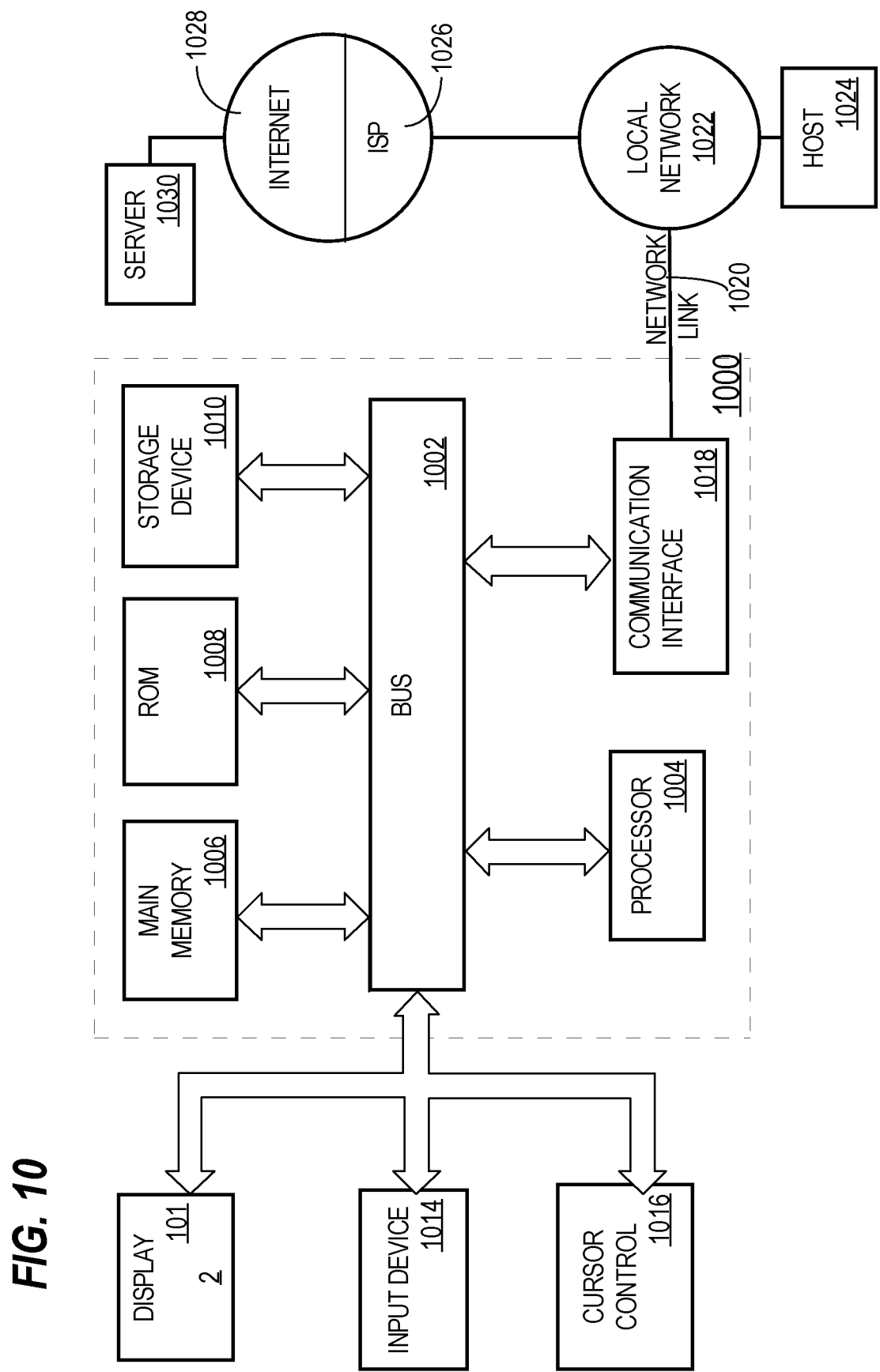

LEVERAGING QUERY-SPECIFIC STATISTICS IN NON-EQUIVALENT QUERIES

CROSS-REFERENCE TO RELATED APPLICATIONS; BENEFIT CLAIM

This application claims the benefit as a Continuation of application Ser. No. 14/041,952, filed Sep. 30, 2013, the entire contents of which is hereby incorporated by reference as if fully set forth herein, under 35 U.S.C. § 120. The applicant hereby rescinds any disclaimer of claim scope in the parent application or the prosecution history thereof and advise the USPTO that the claims in this application may be broader than any claim in the parent application.

This application claims the benefit of U.S. Provisional Application No. 61/707,849, filed Sep. 28, 2012, the entire contents of which is hereby incorporated by reference as if fully set forth herein, under 35 U.S.C. § 119(e).

This application claims the benefit of U.S. Provisional Application No. 61/786,443, filed Mar. 15, 2013, the entire contents of which is hereby incorporated by reference as if fully set forth herein, under 35 U.S.C. § 119(e).

This application is related to U.S. patent application Ser. No. 14/041,750 filed Sep. 30, 2013 and U.S. patent application Ser. No. 14/041,884 filed Sep. 30, 2013, now U.S. Pat. No. 9,471,631 issued Oct. 18, 2016, the entire contents of each of which is hereby incorporated by reference as if fully set forth herein.

FIELD OF THE DISCLOSURE

Embodiments relate to query processing and, more specifically, to changing how a query is processed while an execution plan of the query is being executed.

Embodiments relate to query processing and, more specifically, to generating statistics for optimizing queries.

BACKGROUND

Processing queries typically involves at least two phases: a compilation and an execution. During compilation, one or more database server processes perform many functions, such as parsing the query, determining what table(s), column(s), data type(s), etc., are involved, determining whether an index may be used, and generating an execution plan. This process of compilation is typically referred to as a "hard parse." The execution plan and much information utilized during the compilation stage are saved in a structure referred to as a cursor. During execution, one or more database server processes use the cursor to execute the query.

A query compiler may generate multiple valid execution plans, each of which may be used to generate a valid query result. A query optimizer (which may be the same as or different than the query compiler) selects one of the execution plans for execution. The selection of an execution plan is typically based on an estimated cost of executing the execution plan relative to other candidate execution plans. A query optimizer may take into account several factors to generate an estimated cost, such as the number of rows that may be processed during execution, the number of operations (e.g., joins, table scans) that may be performed, and the number of disk accesses that may be required.

Despite sophisticated attempts at estimating a cost of an execution plan, there may still be circumstances where an execution plan is taking so long that a user (e.g., a database administrator (DBA)) terminates (or "kills") execution. Such an execution plan is referred to as a "catastrophic plan." Once a catastrophic plan is terminated, the user must provide input to ensure that that execution plan is not chosen again for the same or similar query. For example, the user may manually alter the contents of the execution plan, such as changing the type of operations and/or the order in which the operations are executed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 10 is a block diagram that illustrates a computer system upon which an embodiment of the invention may be implemented.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided herein for using information that is gathered during execution of a query to either determine which portion of an execution plan for the query to execute or to improve subsequent executions of the query. The latter use case (i.e., where information gathered during execution of a query is used to improve a subsequent execution of the query) is referred to as "automatic reoptimization." In other words, the information is used during compile time.

In the former use case, the information is used during runtime. Thus, one or more decisions regarding how a query should be executed are made while an execution plan for the query is being executed. An execution plan may include multiple sub-plans. An execution plan that includes multiple sub-plans is referred to herein as an "adaptive plan." A particular sub-plan is selected based on information about one or more operations (of the execution plan) that have or are being performed. Thus, the particular sub-plan is executed while the other sub-plans in the execution plan may not be executed.

Alternatively, instead of multiple sub-plans, a particular execution plan is selected for execution during execution of another execution plan. In this way, the other execution plan is not fully executed.

Techniques are also provided for generating statistics during runtime and storing the statistics if the actual cost of performing one or more operations is significantly different than the estimated cost of performing the one or more operations.

Techniques are also provided for generating statistics automatically when data is being loaded into a database object.

Techniques are also provided for limiting the sharing of statistics on global temporary tables (GTTs). Session identification data that identifies a session in which the statistics were generated may be stored, in a cursor, along with the statistics.

Techniques are also provided for efficient concurrent statistics generation that avoids a potential deadlock scenario.

Techniques are also provided for generating a new type of histogram.

Techniques are also provided for using dynamic statistics in determining whether to share one or more cursors.

Adaptive Plan Execution Overview

Figure 1:
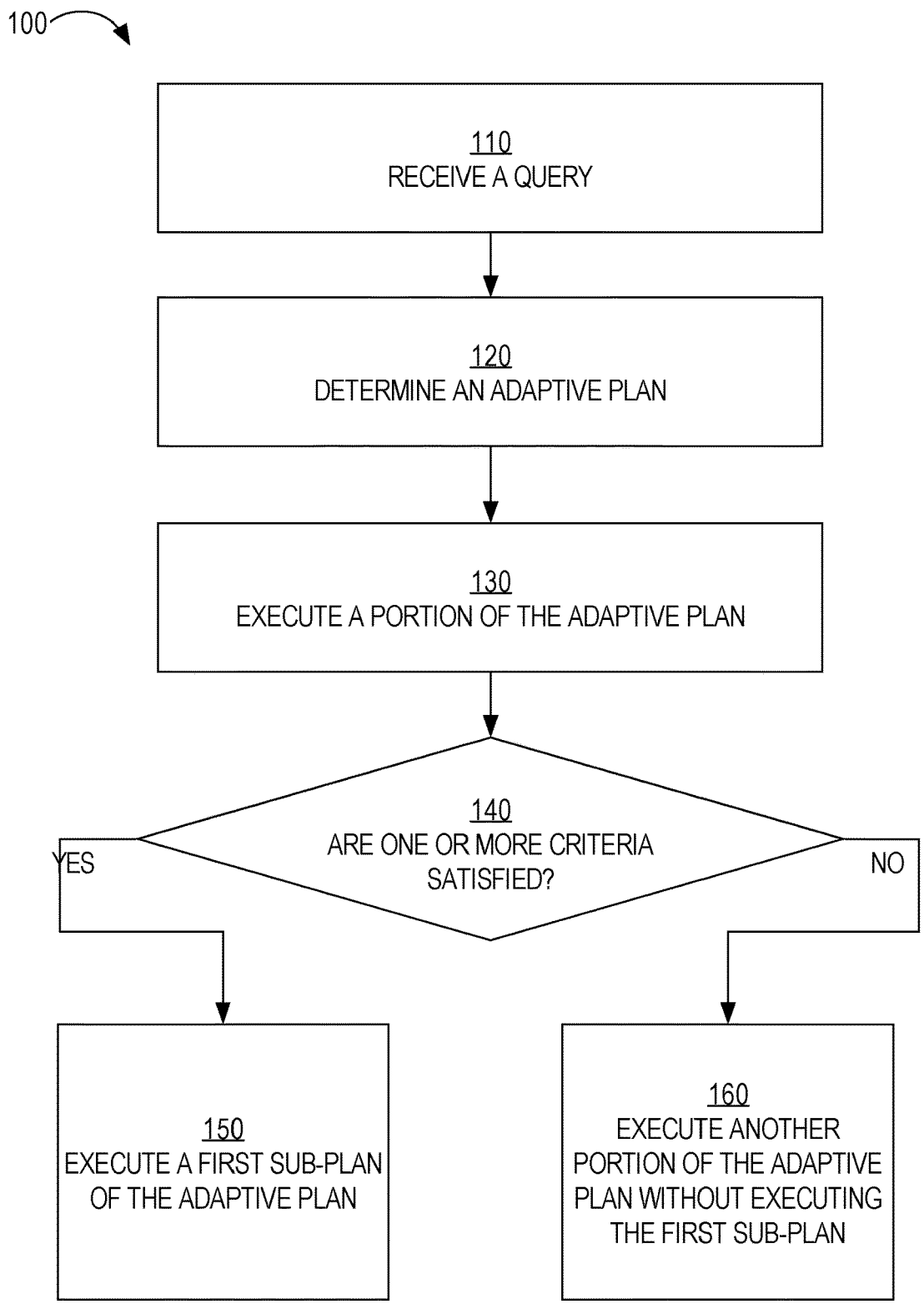
FIG. 1 is a flow diagram that depicts a process for processing a query, in an embodiment.

FIG. 1 is a flow diagram that depicts a process 100 for processing a query, in an embodiment. At block 110, a query is received. The query may conform to a standard query language, such as SQL or XQuery. The query may be an original query that was originally composed by a user. Alternatively, the query may be a rewritten query that results from a query processor modifying an original query based on one or more rules.

At block 120, an adaptive plan is determined. The adaptive plan includes multiple sub-plans. Each sub-plan includes one or more operations. The adaptive plan may be generated in response to receiving the query. For example, a query compiler (or query optimizer) compiles the query to generate the adaptive plan. Alternatively, the adaptive plan may have been generated in response to a previous query that is the same or similar as the current query. In this way, the adaptive plan (or the cursor to which it belongs) is "shared" by multiple queries. Sharing cursors for multiple queries is possible if the queries are syntactically or semantically equivalent. Example approaches to cursor sharing are described in U.S. patent application Ser. No. 11/831,951, the contents of which are incorporated herein by reference as if fully set forth herein.

At block 130, a portion of the adaptive plan is executed. The portion includes a strict subset of the adaptive plan, such as one or more operations. The portion may correspond to a table scan operation. The portion may or may not be part of one of the sub-plans of the adaptive execution plan.

At block 140, it is determined whether one or more sub-plan criteria are satisfied. "One or more sub-plan criteria" are one or more criteria that are used to select a sub-plan from among a plurality of sub-plans in an adaptive plan. An example of one or more sub-plan criteria include an amount of data that has been processed as a result of performing one of the operation(s) in the executed portion of the adaptive plan. Another example of the one or more sub-plan criteria is a number of distinct or unique values that are retrieved as a result of performing one of the operation(s) in the executed portion of the adaptive plan.

Statistics Collector

In an embodiment, an adaptive plan references or includes a statistic collector that collects statistics regarding data that is read, generated, or produced while performing one or more operations in the adaptive execution plan. For example, the statistics collector may determine a number of rows from a table that satisfy a predicate. The number of rows may only be based on a strict subset of the table that has been read. As another example, the statistics collector may determine a number of rows that result from performance of a hash join operation.

Statistics that are determined during execution of a portion of an adaptive plan are used to determine whether the one or more sub-plan criteria are satisfied.

In an embodiment, a statistics collector is an object in an execution plan. The statistics collector may be implemented as a rowsource or may be built into an existing in an existing rowsource. A rowsource is an object that is responsible for retrieving rows from a "source," such as a table or a join operation. A statistics collector may act as a pass-through analyzer whose input is rows from a rowsource and generates information based on the input, such as number of rows, number of distinct values, maximum value, and minimum value.

An execution plan may include multiple statistics collectors, each at different points in the execution plan. Each statistics collector in an execution plan is configured to generate the same or different type of information.

To prevent a subsequent portion of a plan from processing data, a buffer is used to store temporary results. For example, it is desirable to prevent a query execution engine from building a hash table until the query execution engine is "sure" that it will execute a hash join operation. As another example, a query execution engine should not begin executing a nested loops join (NLJ) operation until the query execution engine "knows" it will use the results of the NLJ operation. Another reason to use a buffer is to collection certain types of statistics. Once enough rows are inserted into the buffer, the buffered rows may be sampled to generate statistics.

Thus, in an embodiment, the statistics collector is associated with a particular buffer size. If the amount of data that the statistics collector processes exceeds the buffer size, then that information is used to trigger block 140, i.e., determine whether one or more sub-plan criteria are satisfied. For example, if the buffer size is equivalent to 100 rows of data from table T1 and statistics collector has determined that a hundred rows have been read from table T1, then that information may be used to trigger the determination of which sub-plan to select. The fact that a hundred rows have been read may be used to determine which sub-plan to select. Alternatively, the hundred rows may then be analyzed to determine a characteristic of the hundred rows, such as the number of distinct values of a certain column in the hundred rows. The number of distinct values is then used to determine which sub-plan to select.

If the one or more sub-plan criteria are satisfied, then process 100 proceeds to block 150 where a first sub-plan of the adaptive plan is selected. If the one or more sub-plan criteria are not satisfied, then process 100 proceeds to block 160 where another portion of the adaptive plan is executed without executing the first sub-plan. For example, a second sub-plan of the adaptive plan is selected instead of the first sub-plan.

For example, if performance of a table scan operation results in reading less than two hundred rows, then a first sub-plan is selected. Else, a second sub-plan that is different than the first sub-plan is selected and the first sub-plan is effectively ignored during execution.

In an embodiment, in response to selecting a particular sub-plan during execution of an adaptive plan, sub-plan indication data is stored in a cursor that stores the adaptive plan. The sub-plan indication data indicates (a) the one or more sub-plans that were selected during execution of the adaptive plan and/or (b) one or more sub-plans that were ignored or not selected during execution of the adaptive plan. Sub-plan indication data is used on subsequent executions of the adaptive plan, which may be used for the same or similar query, such as a query that is semantically equivalent but has one or more different bind values than the original query that triggered generation of the adaptive plan. The sub-plan indication data is used so that the determination in block 140 may be skipped and so that the same sub-plan(s) that were executed previously will be executed again. Thus, the adaptive plan might not include execution of a statistics collector during subsequent executions of the adaptive plan.

During execution of an adaptive plan, a statistics collector might fail due to, for example, lack of resource availability, such as memory in order to buffer rows. In an embodiment, the adaptive plan includes a "default" plan that indicates one or more sub-plans that are to be executed and, optionally, one or more sub-plans that are to be skipped.

Adaptive Join

An adaptive plan may be used in multiple contexts. One possible context is determining which access method is better. One access method is scanning a table while another access method is using an index to look up corresponding value(s). Scanning a table for certain data is more efficient than using an index if the scope of the retrieved data is relatively large. If a relatively small amount of data is to be retrieved based on an operation, then an index is generally preferable to a table scan.

Another context in which an adaptive plan may be used is the join context. Multiple types of join operations may be used to produce a valid result for a query. Example join types include nested loops joins (NLJs) and hash joins (HJs). Different joins are useful depending on data distribution. For example, a nested loops join is preferable to a hash join when the first accessed table contains a relatively few number of rows or where the filtering condition is relatively selective, such that few rows satisfy the condition. The selectivity of a predicate (e.g., sal>50000) refers to a percentage of rows of a table (including a view) that satisfy the predicate. A "highly" selective predicate is one where relatively few rows satisfy the predicate, such as 0.01%. Conversely, "low" selective predicate is one where relatively many rows satisfy the predicate, such as 45%.

Figure 2:
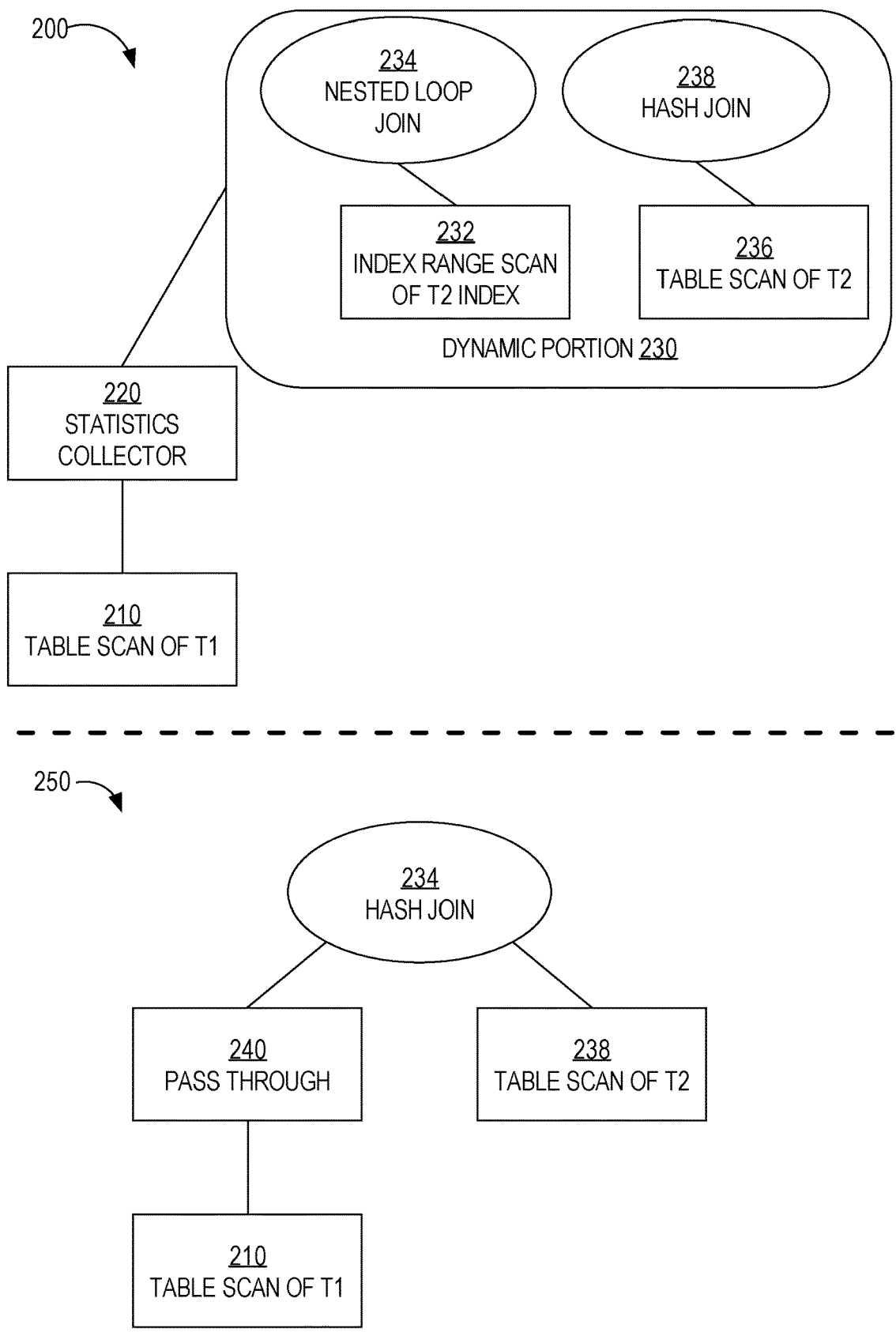
FIG. 2 is a block diagram that depicts an adaptive plan and a final plan that results from executing adaptive plan, in an embodiment.

FIG. 2 is a block diagram that depicts an adaptive plan 200 and a plan 250 that results from executing adaptive plan 200, in an embodiment. Adaptive plan 200 includes a table scan operator 210, a statistics collector 220, and dynamic portion 230. Table scan operator 210 references table T1.

Dynamic portion 230 includes two sub-plans. One sub-plan includes an index range scan operator 232 and a nested loops join (NLJ) 234. The other sub-plan includes a table scan operator 236 and a hash join 238. Index range scan operator 232 references an index of table T2 and table scan operator 236 references table T2.

The statistics gathered by statistics collector 220 are used to determine which sub-plan to use when executing adaptive plan 200. In this example, statistics collector 220 determines a number of rows that have been retrieved from table T1 as a result of executing table scan operator 210. For example, if the number of rows that are retrieved during execution of table scan operator 210 is less than ten, then the "left" sub-plan (i.e., that includes index range scan operator 232) is selected. Otherwise, the "right" sub-plan (i.e., that includes table scan operator 236) is selected.

Even though adaptive plan 200 includes only two sub-plans, an adaptive plan may include more than two sub-plans, depending on the complexity of the query upon which the adaptive plan is based. Thus, an adaptive plan may include multiple statistic collectors or multiple points in the adaptive plan where statistics collection and evaluation is performed. For example, the results of hash join 234 may be further joined with data from a table T3 (not depicted). That additional join may be either a nested loops join or a hash join and, thus, may be represented by two additional sub-plans. Thus, a statistics collector may collect rows that are identified based on hash join 234. The number of those rows (or some other characteristic of those rows) may be used to determine which of the two additional sub-plans to select for execution.

In an embodiment, while adaptive plan 200 includes a binary decision point where one of two sub-plans is selected, an adaptive plan may include a decision point where one of three or more sub-plans may be selected. In other words, instead of being binary, a decision point may be ternary, quaternary, or quinary. For example, instead of determining which of two join methods to use, as in FIG. 2, the determination may be which of three join methods to use.

Additionally, a decision point may be to either remain with the execution plan to which the decision point belongs or to switch to an entirely different execution plan. The different execution plan may use at least a portion of the results generated by the original execution plan or may start execution "from scratch."

In the example of FIG. 2, the "right" sub-plan is selected, which causes adaptive plan 200 to become execution plan 250. In execution plan 250, the results of the table scan operation of table T1 (210) are hash joined (234) with the results of the table scan operation of table T2 (238). A hash join of two tables or relations involves generating a hash table based on the "smaller" table (i.e., the "build phase") and then looking up values in the hash table using rows from the "larger" table (i.e., the "probe phase").

Adaptive Bitmap Pruning

Another context in which adaptive plans may be used is in processing bitmap indexes. A bitmap index provides an efficient and fast means of retrieving data from a database. A bitmap index is an index that includes a set of bitmaps that can be used to access data. In the context of bitmap indexes, a bitmap is a series of bits that indicate which of the records stored in the body of data satisfy a particular criteria. Each record in the body of data has a corresponding bit in the bitmap. Each bit in the bitmap serves as a flag to indicate whether the record that corresponds to the bit satisfies the criteria associated with the bitmap.

Typically, the one or more criteria associated with a bitmap are whether the corresponding records contain a particular key value. In the bitmap for a given key value, all records that contain the key value will have their corresponding bits set to 1 while all other bits are set to 0. A collection of bitmaps for the key values that occur in the data records can be used to index the data records. In order to retrieve the data records with a given key value, the bitmap for that key value is retrieved from the index and, for each bit set to 1 in the bitmap, the corresponding data record is retrieved. The records that correspond to bits are located based on a mapping function between bit positions and data records.

When retrieving data using a bitmap index, several logical retrieval conditions may be combined using Boolean operations on the appropriate bitmaps. For example, if the data that is to be retrieved is subject to the conditions that key1=<val1> and key2=<val2> and key3=<val3>, a bitwise AND of the bitmaps for key values <val1> and <val2> and val3 can be performed to generate a bitmap that indicates the data items that match all three conditions.

Consider the following example query:

```
SELECT prod.name, quarter, sum(sales.amount)
FROM sales, time, customer, product
WHERE . . .
   And time.year = 2012
   And cust.state = 'CA'
   Group By . . . ;
``` which may be rewritten as follows:

```
SELECT . . .
FROM sales, customer, product, time
WHERE sales.time_id
   in (SELECT time_id
      FROM time
      WHERE year = 2012)
   AND sales.cust_id
   in ( . . .
      FROM customer
      . . . )
   AND sales.prod_id in ( . . . );
```

In this example, a bitmap index exists for multiple columns of the sales table (which is a fact table and may be relatively large), such as time ID, customer ID, and product ID. An execution plan using bitmap indexes may involve: (1) joining a bitmap index for time ID with the time dimension table where the time predicate (i.e., year=2012) is applied; (2) joining a bitmap index for customer ID with the customer dimension table where the customer predicate (i.e., cust.state='CA') is applied; and (3) joining a bitmap index for product ID with the product dimension table where any product predicate is applied. Each of these three joins is referred to as a "bitmap join." The result of each bitmap join is then ANDed together to create a final bitmap index that indicates, for each entry in the sales table, whether that entry satisfies all the predicates of the original query.

Many execution plans that include bitmap indexes also involve joining (a) the entries or rows, of the fact table, that satisfy all the predicates with (b) one or more of the dimension tables that correspond to the bitmap joins. Such a join is referred to herein as a "joinback." A joinback is required if the original query selects a column from a dimension table after the joins indicated in the FROM clause are performed. In the above example query, the product name (from the product dimension table) and quarter (from the time dimension table) are selected. Thus, joinbacks of the product dimension table and the time dimension table are required.

However, in an embodiment, one or more bitmap joins are pruned or eliminated from an execution plan during execution of the execution plan. Like a hash join or a nested loops join described previously, a bitmap join may be considered a type of a sub-plan. Thus, an execution plan that includes one or more optional bitmap joins is a type of an adaptive plan.

Determination of whether to prune or skip a bitmap join may be based on one or more criteria. An example criterion is whether a dimension table that corresponds to a bitmap index is to be joined later in the adaptive plan. If so, then a bitmap join using the bitmap index is a candidate for pruning. In the previous example, since the customer dimension was not later joined, then the bitmap join that involves the bitmap index on the customer ID is not a candidate for pruning.

In an embodiment, a join operation involving of a dimension table that is part of bitmap join that may be pruned is added after an AND operation that combines all the resulting bitmaps has been performed. In the above example, a join that involves (a) rows of the sales table that satisfy the time and product predicates and (b) customer table is added to the adaptive plan in case the bitmap join that involves the customer table is pruned during runtime.

The cost of a bitmap scan or join should reduce the data enough to make the later fact table lookup "cheaper" in terms of the number of rows processed. If that is not the case, then the bitmap scan or join should be pruned. Thus, another example criterion is whether a bitmap join is highly selective or, rather, whether the result of performing of the bitmap join results in determining that relatively few rows from the fact table satisfy a corresponding predicate. For example, if a majority of the rows from the sales table are associated with the year 2012, then the bitmap join that comprises joining one or more bitmap indexes with the time dimension table may be pruned. As another example, if less than 20% of the rows from the sale table are associated with a product name indicated in a predicate of the original query, then the bitmap join that involves a bitmap index on the product ID column of the sales table should not be pruned.

Thus, if a bitmap join is not highly selective (i.e., few rows from the fact table satisfy the corresponding predicate) and a later join in the adaptive plan involves the corresponding dimension table, then that bitmap join is a candidate for pruning. Also, as noted above, the "later join" may be added to the adaptive plan even though the original query does not select a column of the corresponding dimension table.

Figure 3:
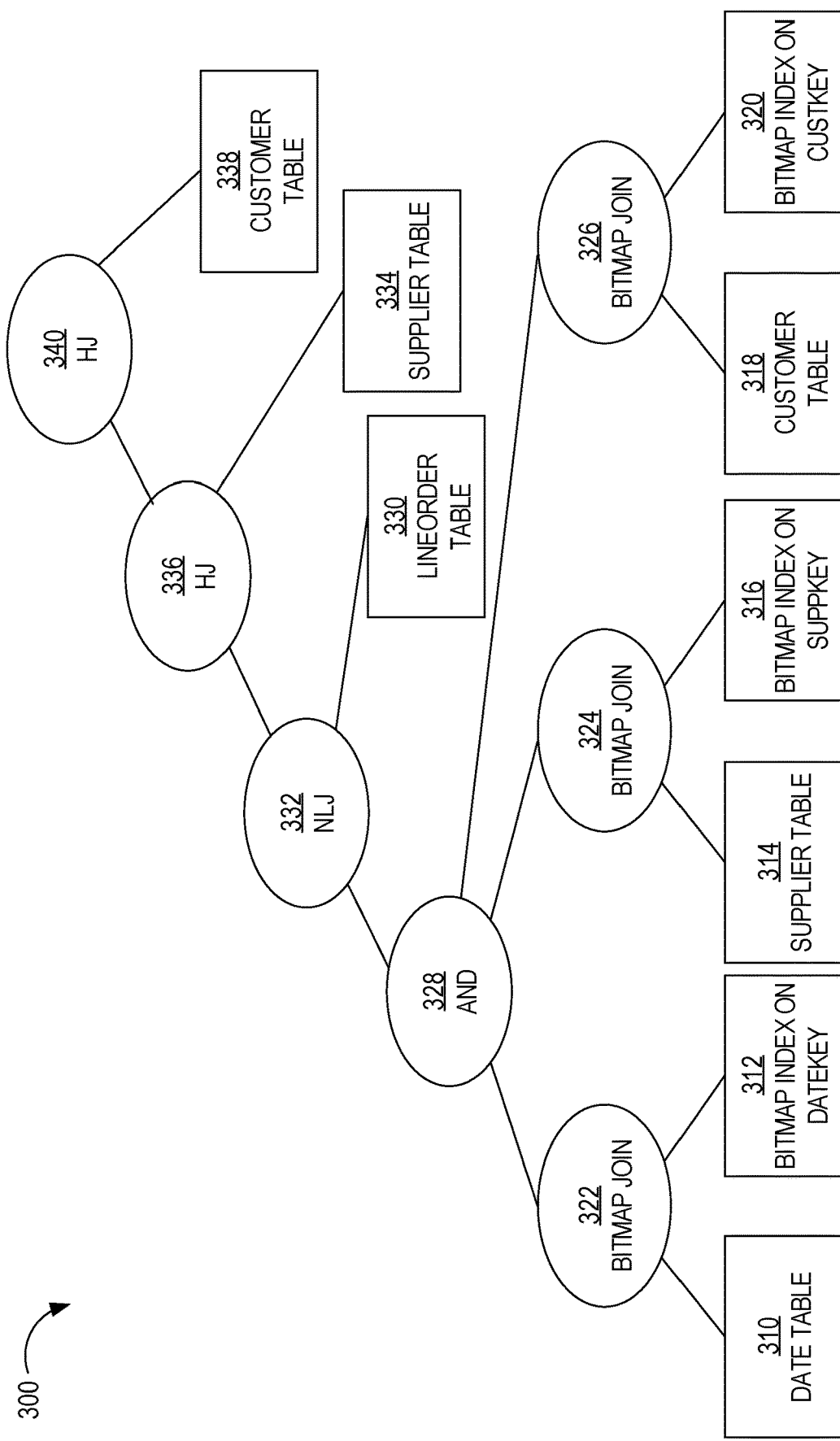
FIG. 3 is a block diagram that depicts an adaptive plan that involves bitmap pruning, in an embodiment.

FIG. 3 is a block diagram that depicts an adaptive plan 300 that involves bitmap pruning, in an embodiment. Adaptive plan 300 is based on a query that has three predicate: one on the date table, one on the supplier table, and one on the customer table, each of which are dimension tables. The fact table is a lineorder table. The query also selects a column from the supplier table. Thus, adaptive plan 300 includes: (1) a bitmap join 322 between date table 310 and a bitmap index 312 on the date column of the lineorder table; (2) a bitmap join 324 between supplier table 314 and a bitmap index 316 on the supply column of the lineorder table; and (3) a bitmap join 326 between customer table 318 and a bitmap index 320 on the customer column of the lineorder table. Adaptive plan 300 also includes an AND operation 328 that ANDs the results from each bitmap join. Adaptive plan 300 also includes a nested loops join operation 332 that joins the results of AND operation 328 with lineorder table 330. The results of operation 332 represents all on the lineitems in lineorder table 330 that satisfy the three predicates.

The query upon which adaptive plan 300 is based involves a select operation, which selects the name of the supplier(s) of lineitems that satisfy the three predicates. Thus, adaptive plan 300 includes a hash join operation 336 (which, alternatively, may be another type of join, such as a nested loops join) with supplier table 334.

During compilation of the query (also referred to as query optimization), it is determined that the predicate on the customer column of the lineorder table (reflected in the results of bitmap join 326) may have high selectivity. In other words, many rows may satisfy that predicate. This determination may be made due to insufficient statistics on the customer column of the lineorder table. For example, statistics may be silent with respect to how selective the predicate is on the customer column. Therefore, bitmap join 326 may be identified as a candidate for pruning. Later, during execution of adaptive plan, the selectivity of the predicate is determined (or at least approximated). This determination is used to determine whether to prune bitmap join 326.

If the query upon which adaptive plan 300 is based does not include a select of a customer column of the lineorder table and bitmap join 326 is identified as a candidate for pruning, then a join operation of the customer table is added to adaptive plan 300. In this example, a hash join 340 and customer table 338 are added to adaptive plan 300. Thus, during execution of adaptive plan 300, if it is determined that bitmap join 326 is to be performed, then hash join 340 is pruned. Conversely, if it is determined that bitmap join 326 is to be pruned, then hash join 340 is not pruned. Instead, data may be stored that indicates that hash join 340 cannot be pruned.

Additionally, a query optimizer may determine whether bitmap join 324 is optional if it is determined that the corresponding predicate has high selectivity. Because the original query includes a select of a column from the supplier table (reflected in hash join 336 and supplier table 334), bitmap join 324 is a candidate for pruning.

Thus, an adaptive plan may have multiple bitmap joins that are optional. Also, multiple additional joins (e.g., hash join 340) may be added to an adaptive plan if a bitmap join (e.g., bitmap join 326) is made optional.

Cost Estimator and Decision Points

As noted earlier, the point at which one sub-plan is chosen over another or whether a bitmap join should be pruned is referred to herein as a "decision point." In an embodiment, a cost estimator determines, for a decision point, one or more values that will be used by a query executor to determine which sub-plan to select or whether to prune a bitmap join. The cost estimator is part of a query compiler or optimizer that is responsible for generating one or more execution plans.

A cost estimator may employ one of multiple techniques to determine what value(s) will be used at a decision point. For example, in the adaptive join context, the cost estimator may use a heuristic to determine which join method to use. The heuristic may be a threshold number of rows from a left table that satisfy a predicate. If, during execution, it is determined that the actual number of rows that satisfy the predicate is greater than the threshold, then a sub-plan that involves a hash join will be selected; otherwise, a nested loops join will be selected. The heuristic may be a specific number of rows, regardless of the known or estimated size of the table. Alternatively, the heuristic may be a certain percentage of rows of the table involved, such as 20%. Thus, the decision point may be after a certain number of rows from a table are retrieved and it is determined whether the percentage of rows that satisfy the predicate is greater than the threshold percentage. Thus, the value at a decision point may be a value that represents an actual occurrence (e.g., ten rows read by the statistics collector) or a value that represents an estimated occurrence (e.g., the statistics collector is on track to read two hundred rows even though only thirty rows have been read thus far).

In the adaptive bitmap pruning context, a cost estimator may apply one or more heuristics to determine whether to prune a bitmap join based on a selectivity of a corresponding predicate. An example heuristic for a predicate may be 35% selectivity, where any selectivity higher than 35% indicates that the bitmap join that corresponds to the predicate is to be pruned.

Another technique to determine a value for a decision point involves a cost estimator generating multiple estimated costs for an adaptive plan using different values at the decision point. For example, in adaptive plan 200, a cost estimator generates (1) a cost of executing adaptive plan 200 where the "left" sub-plan is selected and the number of rows coming from table scan operator 210 is a hundred and (2) a cost of executing adaptive plan 200 where the "right" sub-plan is selected and the number of rows coming from table scan operator 210 is hundred. The cost estimator repeats (1) and (2) one or more times, but with a different "test value" for the number of rows coming from table scan operator 210.

Inflection Point

The cost estimator may repeat (1) and (2) until an "inflection point" is determined. An inflection point is a boundary value of a statistic or optimizer estimate where, below that value, one sub-plan is chosen and, above that value, a different sub-plan is chosen. An inflection point that is determined for a decision point may be one of multiple possible inflection points for that decision point. A cost estimator may repeat (1) and (2) while both estimates indicate that one sub-plan is "cheaper" than the other sub-plan until one of the estimates indicates that one-sub-plan is cheaper and the other estimate indicates that the other sub-plan is cheaper.

Thus, multiple estimated execution costs may be generated for the same adaptive plan. In contrast, cost estimators have computed only a single estimated cost for executing an entire execution plan.

As another example, in adaptive plan 300, a cost estimator generates (1) a cost of executing adaptive plan 300 where bitmap join 326 is performed, the percentage of rows that satisfy the corresponding predicate is 10%, and hash join 340 is not performed and (2) a cost of executing adaptive plan 300 where bitmap join 326 is not performed, the percentage of rows that satisfy the corresponding predicate is 10%, and hash join 340 is performed. The cost estimator repeats (1) and (2) one or more times, but with a different value for the percentage of rows that satisfy the corresponding predicate.

Automatic Reoptimization

In an embodiment, information is collected during execution of an execution plan of a query and that information is used to improve future executions of the same or equivalent (whether syntactically or semantically) query. The process of collecting the information and using the information on subsequent executions of the same or equivalent query is referred to herein as "automatic reoptimization." Thus, while adaptive plan execution is directed to a current execution of a query, automatic reoptimization is directed to one or more subsequent executions of the query (or an equivalent). The first execution of the query may have been fully executed or partially executed.

There are many types of information that may be collected during runtime and used in reoptimization. Examples include cardinality of a table, cardinality of a join, cardinality of a group by, cardinality of an index, number of distinct values, maximum value, minimum value, etc. Each of these types of information may be collected by a statistics collector, described herein.

Figure 4:
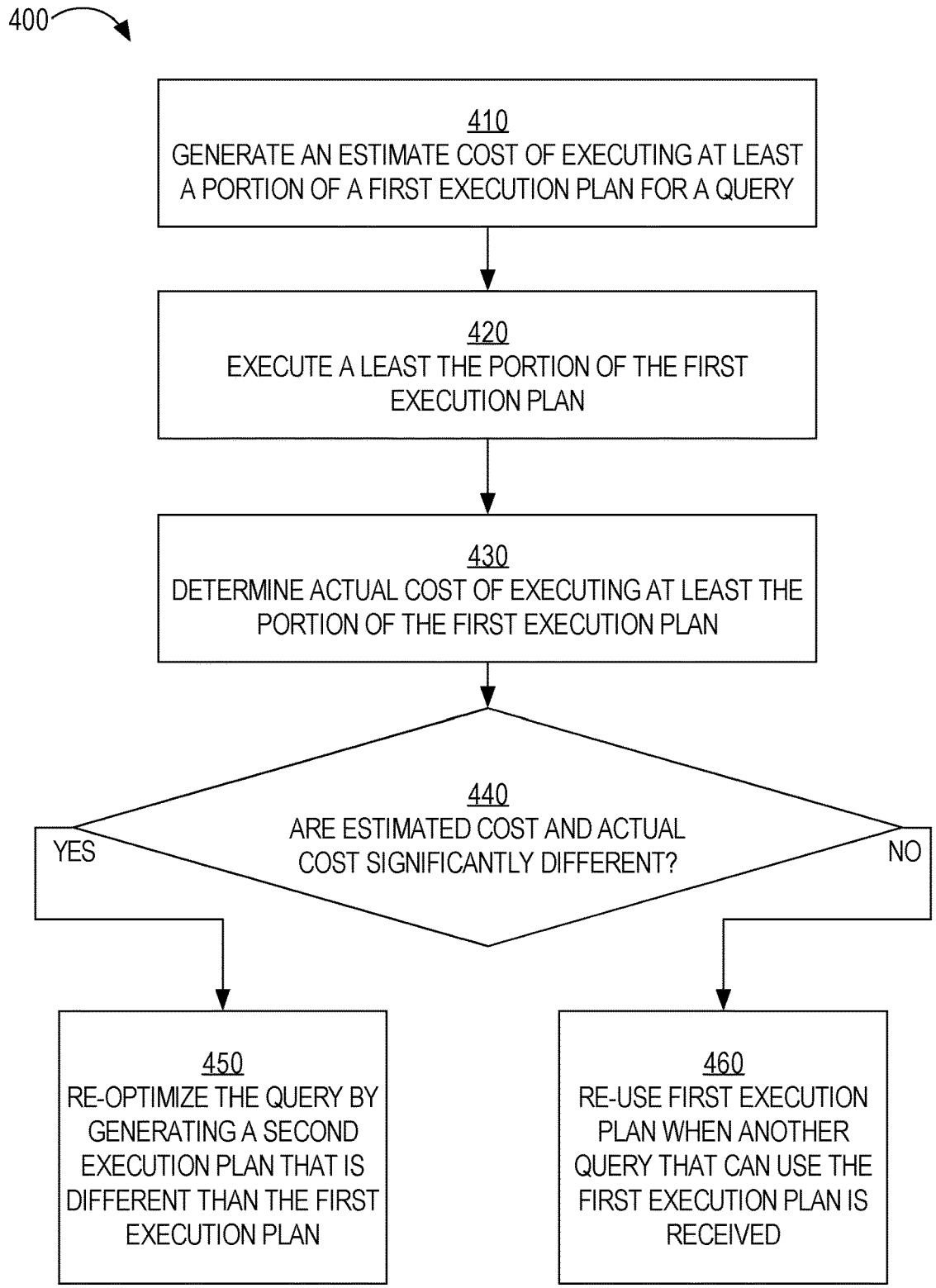
FIG. 4 is a flow diagram that depicts a process for automatic reoptimization, in an embodiment.

FIG. 4 is a flow diagram that depicts a process 400 for automatic reoptimization, in an embodiment. Portions of process 400 may be performed by a query optimizer (or query compiler) while other portions of process 400 may be performed by a query executor.

At block 410, an estimated cost is determined with respect to a first execution plan that has been generated for a particular query. An estimated cost may be in terms of the number of rows that are processed, the number of disk accesses that are performed, the number of comparisons that are performed, the number of machine cycles that are required to execute the query, the time it takes to execute the query, a combination thereof, or other factors that are not listed.

An estimated cost may be an estimate of executing the entire execution plan or an estimate of executing a portion of the execution plan, such as one of the operations of the execution plan. Thus, a statistics collector may be included in numerous places in the execution plan, such as after each operator, in order to collect as much information as possible. All (at least a portion) of this collected information may be fed back into the query optimizer the next time a similar query is received.

At block 420, the first execution plan (or a portion thereof) is executed. During execution, one or more statistic collectors may be triggered to count a number of rows that result from one or more operators in the first execution plan.

At block 430, an actual cost of executing the first execution plan (or a portion thereof) is determined. For example, the total number of rows that are processed during execution of the first execution plan is determined. As another example, the number of rows that are processed during each operation is determined. Thus, statistics information at multiple levels or stages in an execution plan may be determined.

One or more portions of the first execution plan may be performed in parallel. For example, eight slave processes may participate in scanning different portions of a particular table. In an embodiment, determining an actual cost of executing a query involves aggregating information regarding work performed by multiple slave processes. For example, if a first slave process read a hundred rows from a table, a second slave process read two hundred rows from the table, and a third slave process read one hundred and eighty rows from the table, then the actual cost of reading the table may be reflected as four hundred and eighty rows.

At block 440, it is determined whether the actual cost is significantly different than the estimated cost. For example, the actual cost of executing the entirety of the first execution plan may be compared to the estimated cost of executing the entirety of the first execution plan. As another example, the actual cost of executing a certain sub-portion of the first execution plan is compared to the estimated cost of executing the certain sub-portion of the first execution plan. As another example, multiple comparisons are made, where (1) the actual cost of executing a first portion of the first execution plan is compared to the estimated cost of executed the first portion and (2) the actual cost of executing a second portion of the first execution plan is compared to the estimated cost of executed the second portion.

If the actual cost is significantly different than the estimated cost, then process 400 proceeds to block 450. One or more heuristics may be used to determine whether an actual cost is significantly different than the corresponding estimated cost. For example, if the actual cost is greater than twice the estimated cost, then process 400 proceeds to block 450. Process 400 may proceed to block 450 if, for example, only one of multiple actual costs is significantly different than the corresponding estimated cost or if a certain number of actual costs is significantly different than the corresponding estimated costs.

At block 450, a cursor for the particular query marked for "re-optimization." Such "marking" may involve associating, with the cursor, data that indicates that a subsequent query that is the same as or equivalent to the particular query (received in block 410) is (or is recommended) to be re-optimized or re-compiled to generate an execution plan that is different than the first execution plan. Entering block 450 indicates that it may be worth the added cost of generating another execution plan in order to reduce the cost of re-executing the first execution plan for a subsequent query that is the same as or equivalent to the particular query.

Later, when a second query that may use the cursor is received, the data may be read and, in response, the query optimizer determines to parse or compile the second query to generate a second execution plan. The second execution plan may be very different than the first execution plan, such as including different types of joins and/or a different join order.

In an embodiment, execution information that was determined during execution of the first execution plan may be stored in (or in association with) the cursor. An example of such execution information is the actual cost of executing one or more operations indicated in the first execution plan. Then, after a second execution plan is generated for a subsequent query that is the same as or equivalent to the particular query, a cost is estimated for executing the second execution plan (or a portion thereof). The estimated cost may be based on the execution information that was determined during execution of the first execution plan. For example, if the first execution plan involved applying a particular predicate during a table scan and that operation is indicated in the second execution plan, then the actual cost of performing that operation during the first execution plan may be used to estimate the total cost of executing the second execution plan.

When the second execution plan is generated, the query optimizer may determine whether the second execution plan is the same as the first execution plan. If the second execution plan is the same as the first execution plan, then the query optimizer may generate a different execution plan and one or more estimated costs are generated therefor.

If multiple execution plans are generated during reoptimization, the query optimizer may still select the same execution plan. Such a scenario may be possible even after the query optimizer utilizes the updated statistics to generate an estimated cost for each execution plan, since there is no guarantee that any other execution plan is more optimal than the first execution plan.

In an embodiment, if the particular query includes a bind value that is different than a corresponding bind value of a second query, block 450 involves determining whether the bind values are "similar enough." If so, then statistics gathered during execution of the first execution plan may be used to generate a cost of executing the second execution plan. For example, the query optimizer may determine whether the selectivities of the bind values are relatively similar. For example, a first query that includes a predicate for software engineers and a second query that includes a query for sales representatives may yield roughly similar results if there is roughly the same number of software engineers as sales representatives. Otherwise, if the bind values are not similar enough, then one or more of the statistics that were collected during execution of the first execution plan and that involved the bind value in the particular query are not used during reoptimization. This indicates that, because the bind values are different enough, the statistics gathered during the first execution are not reliable to estimate the cost of executing the second query.

If block 450 is not entered, then the first execution plan is re-used if another query that is the same as (or equivalent to) the particular query is received. In response to a negative decision in block 440 (i.e., that the actual cost(s) is/are not significantly different than the estimate cost(s)), data may be stored in the cursor for the particular query. The data indicates that reoptimization is not required or recommended when a subsequent query that may use the cursor is received.

Automatic DOP and Time Feedback

In an embodiment, a query optimizer computes a degree of parallelism (DOP) for a query based on an estimated time that is required to execute the query or a portion of an execution plan for the query. For example, if the query optimizer determines that it will take forty seconds to execute a query, then the query optimizer causes (40 seconds/10 seconds per slave) four slaves to execute the corresponding execution plan (or different portions thereof).

In an embodiment, based on execution statistics determined from executing a query (i.e., during runtime), time information may be fed back into a query optimizer, which may cause the query optimizer to reparse the query. There are two types of time feedback. According to one type of time feedback, if the total execution time of a query on a first run is more than a parallelization threshold (e.g., 10 seconds), then the cursor of the query is marked as reparse and also force parallel mode for the subsequent runs of the same query. The parallelization threshold is used to ensure that, for certain fast-executing queries, the overhead to parallelize a query is not worth the savings in time. Thus, an execution plan, associated with the cursor, that runs in serial on a first execution may run in parallel in one or more subsequent executions of the execution plan.

According to another type of time feedback, at the end of an execution of a query, the execution time for each of the operations is available from the statistics collector (or each statistics collector) in the plan. Execution time of an operation may be reflected based on one or more factors, such as the amount of CPU that was required to perform the operation, the number of buffer gets that were performed during the operation, and an elapsed time for performing the operation.

Based on the actual execution time of an operation, an ideal degree of parallelization (DOP) is derived that may be used for the operation. A DOP may be derived based on an estimate of how long the query should run. For example, if a goal is to make every query complete in under ten seconds, then a query that takes sixty seconds in serial would need a DOP of at least six. But if some operations in the query cannot be parallelized, then a higher DOP for the rest of the query is needed to make the whole query execute in ten seconds. Thus, the execution time per operation is useful in deriving the DOP. Thus, execution statistics from one execution is fed back into the query optimizer in order to improve the DOP computation.

Then the ideal DOP is compared with the estimated DOP. If there is a mismatch (e.g., estimated DOP lies outside the window of 0.5*ideal DOP and 2*ideal DOP), then the actual execution time of the operation is "fed back" into the cursor using a "hint" that may be used by the query optimizer to generate an estimate. During the second execution of the cursor, the actual execution time indicated in the hint is used to compute the DOP. This approach addresses problems of underestimation and overestimation of the DOP of an operator.

In-Flight Reoptimization

In an embodiment, execution of an execution plan for a query is terminated before the execution plan is fully executed based on statistics that are collected during runtime. The query is then re-optimized, or recompiled, to generate a different execution plan. Such a termination and reoptimization is referred to herein as "in-flight reoptimization." For example, statistics that are collected at runtime are compared, at runtime, to estimated statistics that were determined during compile time. If the two sets of statistics are significantly different, then execution of the execution plan is stopped and a new execution plan is generated. For example, if, during runtime, it is determined that applying a predicate to a table scan results in 10,000 rows when only 100 rows were estimated at compile time, then the execution plan is terminated.

The determination of whether to terminate query execution may be based on one or more other factors, such as the number of the operations that remain to be performed in the execution plan, the estimated cost of performing those operations, etc.

Additionally or alternatively, during runtime, a query optimizer may re-compute an estimate for executing an execution plan using statistics that are generated during runtime. Thus, if estimates of "early" operations in an execution plan are significantly different than actual costs of the early operations, then re-computing the total cost estimate for executing the execution plan may yield an estimated cost that is less than a re-computed total cost estimate for executing a different execution plan. If another execution plan is estimated to have a lower total cost (based on the statistics gathered at runtime of the execution plan) relative to the updated total cost estimate for the execution plan (or the difference is "significant enough"), then the execution plan may be terminated and the other execution plan initiated.

Statistics

Many types of statistics may be gathered on database objects, such as tables, views, and indexes. Example statistics include histograms indicating distribution of various values stored in a column, a number of distinct values in a column, bind values in various queries, and selectivities of various predicates, which may involve one or more multiple columns.

Statistics may be collected in many different ways. Some statistics may be collected during a compilation phase of query processing (referred to as "dynamic sampling"). Some statistics may be collected during execution of a query (referred to as "dynamic statistics"). Some statistics may be collected when no query (at least no query that includes an operation that corresponds to any of the statistics) is being processed (referred to as "static sampling").

One approach for storing statistics involves storing statistics in (or in association with) the cursor that includes an execution plan for which the statistics are applicable. For example, dynamic sampling is performed to generate a set of statistics for a particular query. The set of statistics are used to estimate a cost of executing one or more execution plans for the particular query. The set of statistics may be stored in a cursor that stores (or is associated with) the one or more execution plans. As another example, dynamic statistics are gathered during execution of a query. If the cursor sharing is enabled, then the cursor is retained for a period of time. However, over time, a cursor may be "aged out" of a cursor cache if the cursor is not used frequently enough. Thus, all the statistics that are stored in (or in associated with) the cursor are lost.

In another approach, statistics are stored permanently and accessible to a query optimizer and, thus, are available to all future query executions. However, such an approach requires a significant amount of storage and sophisticated storage techniques in order for relevant statistics to be identified and used for a subsequent query. Another drawback is that some statistics are only relevant for a short time period. Using irrelevant or "stale" statistics may make query costing even more inaccurate. Additionally, determining which statistics are "stale" may be difficult to determine. Thus, automatically aging out irrelevant statistics may prove difficult.

In an embodiment, only some statistics that are collected during execution are stored persistently and relied upon by other queries for determining a cost of executing the queries, even queries that are very different than the query for which the statistics were generated. In other words, statistics gathered during execution of a first query may be used to estimate the cost of executing a second query even though there is no execution plan that can be used for both the first query and the second query and that would yield valid results.

Plan Directives

In an embodiment, the statistics that are gathered during execution of an execution plan are only stored if the actual cost of (e.g., cardinality associated with) an operation is significantly different than the estimated cost of the operation. Such an occurrence is referred to herein as a "misestimate." For example, if a first query includes a filter operation on a table scan and the filter operation produces over a thousand rows when only fifty rows were estimated to be produced as a result of performing the filter operation, then a "plan directive" may be created and stored that identifies the table and the one or more columns that were involved in the filter operation.

A "plan directive" is data that indicates information about a misestimate. Because a misestimate involves one or more database objects and an operation, a plan directive identifies a database object (e.g., an index or table) and, optionally, an operation that is associated with misestimate. For example, a plan directive may identify two columns of a table. Such a plan directive indicates that there was a misestimate that involved the two columns, such as a predicate on the two columns. As another example, a plan directive may indicate a join (and, optionally, the type of join) and identify two tables that were involved in the join. Such a plan directive indicates that there was a misestimate that involved a join of the two tables.

In an embodiment, a plan directive does not include any bind values or predicates of a query whose execution triggered the creation of the plan directive. For example, if a plan directive was created for a join of a sales table and a customer table and a predicate is "customer.location='CA'," the plan directive does not include the predicate. Instead the plan directive only identifies one or more database objects and, optionally, an operation (e.g., scan, filter, join) that was performed on the one or more database objects. In this way, plan directives may be used across multiple query statements with similar constructs. For example, a query with "customer.location='CA'" and another query with "customer.location='NY'" may use the same plan directive.

A plan directive may be stored in a repository that is accessible to a query optimizer. Specifically, plan directives may be stored in dictionary tables of the repository. The repository may be local or remote relative to the query optimizer. Plan directives may be stored based on information reflected in the plan directives. For example, all plan directives that identify a first table are stored in a first file (or first table) while all plan directives that identify a second table are stored in a second file (or second table). Thus, a plan directive may be stored in multiple files (or locations). Due to organizing plan directives in this way, a query optimizer may only access one or two files (or tables) during query optimization.

Later, in response to receiving a second query, a query optimizer checks the repository to determine whether any plan directive is relevant to an operation indicated in a query. Plan directives may be loaded into a local (i.e., relative to the query optimizer) cache before or during query compilation. If so, different actions may be performed based on the status of the plan directive.

Plan Directive Status

In an embodiment, a plan directive is associated with one of multiple possible statuses. The status of a plan directive indicates what action(s) have been performed in response to a misestimate indicated by the plan directive and/or what action(s) may be performed by a query optimizer.

Example statuses include "NEW," "MISSING STATS," "HAS STATS," and "PERMANENT." Other embodiments may include fewer or more statuses.

When a plan directive is created, the status of the plan directive may be set to "NEW," indicating that the plan directive is new. Thus, the misestimate that triggered the creation of the plan directive may not have been determined before or at least within a certain period of time.

Later, when a query is analyzed and one or more candidate execution plans are generated, a query optimizer identifies one or more database objects (e.g., indexes, tables, etc.) in a candidate execution plan and determines whether there is a relevant plan directive. The query optimizer may perform this analysis for each operation that is identified in a candidate execution plan. Each operation, when executed, operates on one or more database objects. The identity of the one or more database objects is used to identify one or more relevant plan directives.

If the status of a plan directive is "NEW," then the query optimizer determines whether there are statistics for the database object(s) identified by the plan directive. Statistics may be stored in one of multiple locations, such as in a table definition that defines attributes of a table that is identified by the plan directive. If statistics are available, then the query optimizer uses the statistics to generate a cost estimate of executing a candidate execution plan (or a portion thereof) and changes the status of the plan directive from "NEW" to "HAS STATS." Otherwise, the query optimizer changes the status of the plan directive from "NEW" to "MISSING STATS" and may perform dynamic sampling in order to generate a cost estimate for executing a candidate execution plan (or a portion thereof).

If a query optimizer determines that the status of a plan directive is "MISSING STATS," then the query optimizer may perform dynamic sampling in order to generate a cost estimate for executing a candidate execution plan (or a portion thereof).

In an embodiment, plan directives may be analyzed to identify plan directives that are associated with the "MISSING STATS" status. Such analysis may be performed periodically (e.g., every 24 hours) or in response to certain events, such as detection of a relatively low workload on a database server or database system. When a plan directive that is associated with the "MISSING STATS" status is located, a database process generates statistics for the database object(s) identified in the plan directive. For example, if a plan directive identifies two columns of a table, then a database process analyzes the two columns and generates statistics for the group of two columns, such as the number of distinct values in each column and/or a histogram of different values in each column. Once statistics are generated for the database object(s) identified in the plan directive, the status of the plan directive is changed from "MISSING STATS" to "HAS STATS."

If a query optimizer determines that the status of a plan directive is "HAS STATS," then the query optimizer retrieves pre-computed statistics that pertain to the database object(s) identified in the plan directive. For example, column group statistics may be retrieved and used to generate an estimated cost of executing a candidate execution plan. Thus, instead of performing dynamic sampling, the query optimizer utilizes statistics for the database object(s).

In an embodiment, if (1) the status of a plan directive is "HAS STATS", (2) a query optimizer uses pre-computed statistics to generate an estimate, and (3), during execution, a misestimate is determined for the same database object(s) that are identified in the plan directive, then the status is changed from "HAS STATS" to "PERMANENT." Alternatively, the change from "HAS STATS" to "PERMANENT" may occur after two or more consecutive misestimates are determined for a plan directive that is associated with "HAS STATS." If a misestimate is not determined for the database object(s) identified in the plan directive, then the status of the plan directive may remain "HAS STATS" since the pre-computed statistics are considered "accurate" or accurate enough.

If a query optimizer determines that the status of a plan directive is "PERMANENT," then the query optimizer performs dynamic sampling even though there may be pre-computed statistics for the database object(s) that are identified in the plan directive. The "PERMANENT" status informs the query optimizer that relevant pre-computed statistics (such as column group statistics) should not be used. In other words, any pre-computed statistics on the database object(s) identified in the plan directive are ignored.

Multiple Misestimates in an Execution Plan

In an embodiment, if multiple misestimates are determined as a result of execution of an execution plan, then a plan directive for a misestimate is only created if the misestimate corresponds to an operation that does not depend on another operation for which a misestimate exists. For example, a first misestimate may be determined for a set of one or more columns on a table and a second misestimate may be determined for a join operation that requires the set of one or more columns. It is likely that the second misestimate may be due to the first misestimate. Thus, a plan directive is created for the first misestimate but not for the second misestimate.

Deleting Plan Directives

Because many misestimates may occur over time on many different columns or tables, a large number of plan directives may be created. In an embodiment, plan directives are examined for deletion. Such an examination may be performed periodically (e.g., every 24 hours) or in response to certain events, such as a system restart or a software update.

One or more deletion criteria may be used to determine whether to delete a plan directive. One example criterion may be whether the plan directive is relevant. For example, after a plan directive that indicates a join and identifies two tables is created, one of the two tables is deleted. Therefore, the plan directive is no longer relevant and may be deleted. As another example, after a plan directive that identifies two columns of a table is created, one of the columns is dropped. Therefore, the plan directive is no longer relevant and may be deleted.

Another example criterion is whether a plan directive has been associated with the same status for a particular period of time without change or the status has not changed once after a number of examinations by a query optimizer during optimization phases. For example, if a plan directive has been associated with "HAS STATS" for over two weeks, then the plan directive may be deleted.

Another example criterion is whether a particular period of time has elapsed since the most recent use of a plan directive. For example, if a plan directive has not been used in the last 24 hours or one year, then the plan directive may be deleted. In order to make such a determination, a plan directive may be associated with a timestamp that indicates a most recent time at which the plan directive was used when compiling a query. If the difference between a current time and the timestamp of a plan directive is greater than a particular threshold, then the plan directive is deleted. The particular period of time may be modified based on user input.

Statistics on Load

Statistics on database objects may be generated at different times. For example, after a table is created, a database process may periodically (such as every 24 hours) scan each column of the table and generate statistics for each column. As another example, a user, such as a database administrator (DBA), may submit a database statement or a script that specifies or at least indicates a database object and that, when executed, causes statistics to be generated for the database object.

Statistics may be at varying degrees of granularity, such as on a table basis or a column basis. Example statistics include the number of rows in a table, the number of distinct values in a column, the maximum value in a column, the minimum value in a column, a histogram, a number of null values, and average column length.

In an embodiment, statistics are automatically gathered on a database object while data is being loaded into the database object. For example, a database statement may be one of the following:

```
CREATE T1
AS SELECT . . .
    FROM T2
    WHERE . . .
INSERT INTO T1
    SELECT . . .
    FROM T2
    WHERE . . .
```

The first example statement is a DDL (data definition language) statement. The second examples statement is a DML (data manipulation language) statement. Both example statements, when executed, cause a bulk load operation to be performed. During execution of both example statements, statistics are gathered for T1 while data is loaded from table T2 into table T1. For example, a row count that indicates a number of rows in T1 may increment for each row from T2 that is inserted into T1. As another example, a column max variable may exist for each column of T1 and is compared to each corresponding column value that is inserted into T1 from T2 to determine whether the column max variable for the column should be updated.

A benefit of this approach is that, after the table creation or insertion, a separate table scan of the newly created or updated table is not required in order to generate one or more statistics for the table. Another benefit of this approach is that explicit user input that specifies a gather instruction is not required to initiate the statistics gathering.

In an embodiment, if an explicit gather statistics instruction follows a create table statement or insert into statement, then a determination is made regarding which statistics are missing and, if any statistics are missing (or stale), those statistics are gathered. For example, if it is determined that index statistics and histograms are missing, then those statistics are gathered. However, table statistics and basic column statistics that have been gathered during the bulk load operation are not gathered since those statistics are not missing (or stale)

Partitioned Tables

A table partition may also be populated using a similar database statement described above, such as:

```
INSERT INTO T1 PARTITION (T1_P1)
AS SELECT . . .
    FROM T2
    WHERE . . .
```

In an embodiment, statistics are automatically gathered on partition T1_P1 during execution of such a database statement without requiring an explicit instruction in the database statement to perform the gather statistics operation.

Incremental

In an embodiment, a table partition is maintained in incremental mode. In incremental mode, a table partition is associated with an auxiliary data structure, referred to herein as a "synopsis." A synopsis is a uniform sample of distinct values in the table partition. A synopsis may be used to derive a number of distinct values at the global (or table) level.

In incremental mode, if a gather statistics operation targets a table and statistics are already available on one of the partitions of the table, then statistics are not again gathered for that table partition. Also, statistics on the table may be derived based on statistics for each table partition. For example, a table is partitioned into TP1, TP2, and TP3 and statistics have been generated for TP1 and TP2. If a gather statistics operation targets the table, then TP3 is read to generate statistics, but TP1 and TP2 are not read. Furthermore, statistics for the table may be generated by combining the statistics from each of TP1, TP2, and TP3.

In an embodiment, a table that is not partitioned may be maintained in incremental mode. For example, a table includes one thousand rows and statistics have been gathered on the thousand rows. In response to receiving a DML statement that inserts another thousand rows into the table, statistics are gathered on the thousand rows that are inserted. Then, statistics on the entire table is determined based on (1) the statistics for the first thousand rows and (2) the statistics for the second thousand rows. In this way, the first thousand rows do not need to be read again in order to generate statistics for the entire table as updated.

Global Temporary Tables

A database system may support many sessions concurrently. A session is a specific connection between a client and a database server instance. One or more server instances may execute on a single node of a database system. Each node is connected to one or more non-volatile storage devices.

A global temporary table (GTT) is a table that may be viewed by multiple sessions but may contain different sets of data for each session. Thus, a GTT is session-private. Also, while a GTT has a persistent definition, data in a GTT is not persistent. When a session is closed, the data in the GTT for that session is deleted or lost. Another feature of a GTT is that no redo information is generated for data in the GTT.

Private Statistics

One approach for maintaining statistics on a GTT is to share statistics across sessions. However, statistics collected in one session can cause suboptimal plans in another session. For example, a GTT in a first session may have one hundred rows, whereas the GTT in a second session may have one thousand rows. If statistics of the GTT in the first session is shared with a query optimizer that receives a query through the second session, the query optimizer may use the statistics to generate a suboptimal execution plan based on the statistics that indicate that the GTT has only a hundred rows. To avoid this problem, a user (e.g., a DBA) may either force dynamic sampling for a user's queries or set the statistics for tables in the user's session. However, both workarounds are manual and cumbersome.

In an embodiment, a GTT supports session-private statistics. In other words, the global temporary table has one version of statistics per session. Thus, a query optimizer relies on GTT statistics that have been generated in the session in which a query is issued or submitted. Such an approach alleviates users from any special handling of queries involving GTTs. Private-session statistics may be stored in volatile memory.

Private Cursor

As noted previously, a cursor may be "shared" by multiple queries. Multiple queries may share the same cursor if an execution plan associated with (or stored within) the cursor may be used to generate valid results for the queries.

In an embodiment, a cursor is associated with a session identification data and that data is used later to determine whether the cursor may be shared. For example, a first query is analyzed (e.g., by a query optimizer) and, if it is determined that the first query refers to a GTT, then session identification data is created and stored in the cursor for the first query. The session identification data uniquely identifies the session (at least relative to other sessions that are concurrently executing or that might execute during the existence of the GTT) in which the first query was issued. Later, when a second query is received, it is determined to which session the second query belongs. The determined session is compared to the session data associated with the cursor (and, optionally, to session data of each other "shareable" cursor). If the session of the second query is different than the session of the first query, then the cursor cannot be shared with the second query.

If a query does not target a GTT, then session identification data is not stored in association with a cursor that is generated for the query. Thus, the cursor may be shared in any session.

Commit Free Statistics Gathering

One approach for gathering statistics involves storing the statistics in persistent storage, such as a hard disk. The statistics may be stored persistently in a dictionary table. The storage of the statistics to persistent storage is triggered by a commit statement.

In an embodiment, a commit statement is not used when statistics are gathered for a GTT. This approach is used if statistics for the GTT are stored in memory only. A commit statement would cause the statistics to be stored in persistent storage. Because statistics for a GTT are private with respect to a particular session, the statistics are not relevant to any other session. Therefore, the statistics for a GTT do not need to be stored in persistent storage.

Statistics Gathering

As noted previously, statistics may be generated or gathered for different database objects, such as tables and indexes. Statistics gathering may be performed automatically or in response to user input, such as input from a DBA. For example, statistics gathering may be performed every 24 hours or in response to the occurrence of one or more events, such as detecting that resource utilization for certain resources (e.g., CPU, volatile memory, network I/O) is below a certain threshold. While statistics may be gathered for database objects other than tables (e.g., indexes or partitions), the following description is in the context of tables.

In some instances, it is determined that statistics are to be gathered for multiple tables. The multiple tables may be identified in user input or automatically. In response to determining that statistics are to be gathered for multiple tables, a database server causes a statistics gathering operation to be performed for each table in the list. One approach for performing a statistics gathering operation is to serially scan and generate statistics for each table in the list. Such a serial approach may take a significant amount of time and does not take advantage of most system resources on powerful systems. Also, if an "earlier" table is relatively large and, as a result, statistics gathering on the table takes a significant amount of time, statistics gathering for each "subsequent" table essentially has to wait until gathering statistics has completed for the earlier table.

Concurrent Statistics Gathering

In an embodiment, multiple computer jobs or tasks (e.g., processes) are created and each computer job is assigned a different table of the multiple tables. A computer job is responsible for performing the task assigned to it, which is gathering statistics for one or more tables. Each table may be identified in a single list that is provided by a user. Alternatively, each table may have been automatically identified as candidate tables for statistics gathering.

Thus, if there are three tables to scan, then three computer jobs may be created. Each computer job may then be scheduled to be executed in parallel, such as in a multi-core computer system, where each computer job is executed by a different CPU. Thus, statistics may be gathered for each of the tables concurrently. The computer jobs may be executed in different sessions.

One advantage of this concurrent approach is that a user does not have to specify a different gather statistics instruction or script for each table for which the user desires statistics to be gathered concurrently.

In an embodiment, if a table is partitioned into multiple partitions, then multiple computer jobs are created, each computer job being assigned one or more partitions of the table. The multiple computer jobs may be executed in parallel. If incremental statistics gathering is enabled, then a determination is made when each computer job is finished. After it is determined that each of the multiple computer jobs is finished, then another computer job (or one of the multiple computer jobs) is assigned the task to gather "global" statistics, or statistics for the entire table based on partition statistics that were gathered as a result of each executed computer job. Thus, gathering statistics for the table may involve aggregating or combining the statistics from each partition of the table without reading any data from the table.

Batching

One approach for gathering statistics for multiple database objects (e.g., tables and/or partitions) involves creating a computer job for each database object regardless of the size of the object or how long it takes to gather statistics for the database object. However, such an approach may be inefficient in that the resources required to allocate a computer job and assign it to a database object may be high relative to the resources required to gather statistics on the partition, especially if the partition is relatively small. For example, if a table has one thousand partitions and a computer job is created for each partition, then many computer resources (such as memory and CPU required for each computer job) may be wasted.

In an embodiment, a single computer job for gathering statistics is assigned to multiple database objects. In other words, a single computer job is responsible for gathering statistics for multiple database objects. Such an approach is referred to as "batching." For example, a computer job is assigned to multiple partitions of a table while another computer job is assigned to another partition of the table.

Database objects are selected for a single batch or computer job based on information about the database objects. For example, a size of each of multiple database objects is determined and a subset of the database objects are assigned to a single job based on the size of each database object in the subset. A general principle for batching may be assigning relatively small database objects to the same computer job while relatively large database objects may be assigned their own computer job. For example, three table partitions P1, P2, and P3 have the following sizes, respectively: 7 MB, 11 MB, and 20 MB. Size may be estimated based on the number of blocks that are required to store data of the partition (or table). For example, one heuristic may be that a thousand blocks takes about one second to perform statistics gathering. Partitions P1 and P2 are assigned to the same computer job while partition P3 is assigned to another computer job. In this way, if executed concurrently, the computer jobs may finish processing at roughly the same time. Otherwise, if each partition was assigned a different computer job, then the computer job for P1 will likely finish significantly sooner than the computer job for P3.

As another example of the information that may be used to batch database objects, an expected or estimated processing time associated with each database object is determined. An expected or estimated processing time for a database object may be based on how long it took to gather statistics for the database object previously. For example, if it took two minutes to gather statistics for P1 the last time statistics were gathered for P1, then it may be determined that it will take about two minutes to gather statistics for P1 again. Additionally, the amount and type (e.g., inserts, deletes) of changes that have been made to the database object since the last statistics gathering for the database object may be taken into account when estimating a processing time for the database object. For example, if it took three minutes to gather statistics for a partition at one point in time and the partition has doubled in size since that time, then it may be estimated that it will take about six minutes to gather statistics for the partition.

In an embodiment, database objects are assigned to a computer job based on an estimated cost (e.g., estimated time) of gathering statistics for the database objects relative to an estimated cost of overhead associated with the computer job. Overhead of a computer job may include a cost of creating a computer job and/or maintaining the computer job. A process that is responsible for creating computer jobs may maintain a variable that indicates a threshold percentage that indicates an amount of work required to create multiple computer jobs relative to an amount of work required to execute the computer jobs. The amount of work may be represented in time, machine cycles, memory, and/or disk I/O, etc. The variable may be labeled, "job_overhead_percentage." The computer jobs may be specific to partitions of a single table. Alternatively, the computer jobs may be for different tables and/or for different partitions of different tables. If "job_overhead_percentage" is 1%, for example, then computer job overhead should take no more than 1% of overall statistics gathering. The variable may have a default value and may be configurable by a user, such as a DBA.

For example, if it is estimated that gathering statistics for partition P1 will take about two minutes and gathering statistics for partition P2 will take about one minute, then job creation and maintenance should take no more than (3 minutes×60 seconds/minute*1%=) 1.8 seconds. However, if job creation and maintenance is estimated to take about 2.5 seconds, then another database object or partition should be assigned to the computer job. A third partition that is estimated to take at least about 1.17 minutes may be assigned to the computer job in order to reach the 1% threshold. An estimated time creating and maintaining a computer job depends on system resources and is independent of the number of tables and/or partitions that are assigned to the computer job. The estimated time may be computed specified to each server after installation during the first run.

Deadlock Prevention

One approach for creating computer jobs for gathering statistics is to create a computer job for each database object for which statistics are requested (whether based on user input or identified automatically). However, such an approach may lead to deadlock.

For example, a system only has enough resources to support two computer jobs (J1 and J2) at a time. If a computer job is created for two tables (T1 and T2) and each table comprises a plurality of partitions, then two table coordinators (C1 and C2) may be created relatively simultaneously, one for each of the two tables. A main coordinator process may be responsible for creating each table coordinator. In an embodiment, a job scheduler program works with a resource manager program to determine when to create computer jobs and how many computer jobs to create at a time. These programs interact with an operating system (of a server node upon which the programs execute) to allocate a system-level process or thread. The main coordinator is able to communicate with each table coordinator. For example, the main coordinator may send, to a table coordinator, a start message that causes the table coordinator to begin. In turn, a table coordinator may send, to the main coordinator, a message that indicates that a problem has occurred, that all computer jobs managed by the table coordinator have finished, etc.

Each table coordinator is responsible for creating a computer job for each partition (or group of partitions) of the table to which the table coordinator is assigned. After each table coordinator is assigned a computer job, each table coordinator will request a computer job for each of its partitions and wait until its request is fulfilled. A table coordinator may also be configured to communicate with each computer job, similar to communication between the main coordinator and a table coordinator. For example, a table coordinator may send, to a partition computer job, a message that indicates that the job should proceed or that the job should stop immediately, even if the job has not yet completed. As another example, a computer job assigned to one or more partitions may send, to its table coordinator, a message that indicates that the computer job has completed or that an error occurred during execution of the computer job.

Returning to the example, after each table coordinator is assigned a computer job (e.g., C1 to J1 and C2 to J2), each table coordinator will request a computer job for each of its partitions and wait until its request is fulfilled. However, because there are already two running computer jobs (J1 and J2), one for each table coordinator and the system only supports two computer jobs, each table coordinator will wait indefinitely and no statistics gathering will be performed. This is an example of a deadlock scenario.

In an embodiment, a coordinator for a partitioned database object, such as a table, is not initiated until computer jobs have been allocated or assigned to all partitions associated with another coordinator. For example, a computer job is not assigned for C2 until computer jobs of each partition of T1 have been allocated or have begun. The allocation of J2 to C2 does not have to wait until any of the computer jobs for the partitions of T1 have completed. If the system only supports two computer jobs, then C2 will have to wait until all of the statistics have been gathered for the partitions of T1. If the system supports more than two computer jobs, then C2 may be allocated a computer job before all of the statistics have been gathered for the partitions of T1. For example, if the system supports five computer jobs and T1 has two partitions (T1_P1 and T1_P2), then, at one point in time, a computer job may be assigned to each of C1, T1_P1, T1_P2, C2, and T2_P1 (a partition of table T2).

Figure 5:
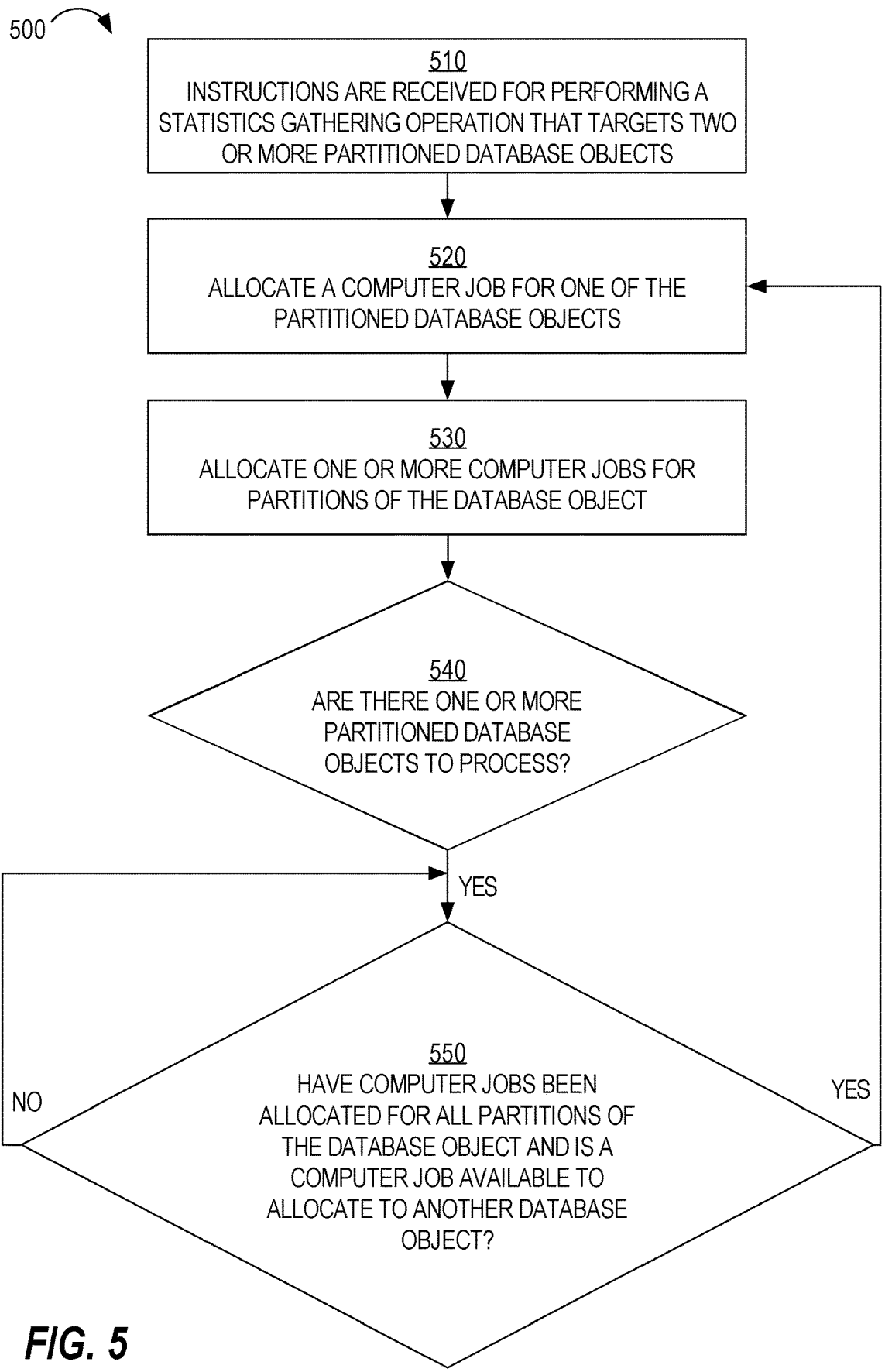
FIG. 5 is a flow diagram that depicts a process for allocating computer jobs for gathering statistics, in an embodiment.

FIG. 5 is a flow diagram that depicts a process 500 for allocating computer jobs for gathering statistics, in an embodiment. At block 510, instructions are received to perform a statistics gathering operation for two or more partitioned database objects.

At block 520, a computer job is allocated for one of the database objects of the two or more partitioned database objects.

At block 530, one or more computer jobs are allocated for partitions of the database object. For example, one computer job may be allocated for all partitions of the database object. Alternatively, multiple computer jobs may be allocated for different ones of the partitions of the database object. For example, a first computer job may be allocated for partitions P1-P3 of table T1 and a second computer job may be allocated for partition P4 of table T1.

At block 540, it is determined whether there are any more database objects for which statistics are to be gathered as part of the statistics gathering operation. If so, then process 500 proceeds to block 550. Else, process 500 may end.

At block 550, it is determined whether (1) computer jobs have been allocated for all partitions of the database object and (2) a computer job is available to allocate to a second database object of the two or more partitioned database objects. Block 550 may be performed continuously, at regular intervals, or in response to certain events, such as a detection that one or more computer jobs have been or may be deallocated. If both determinations are true, then process 500 proceeds to block 520.

In an alternative embodiment, block 540 is performed after block 550. For example, if block 530 has only been performed once for a particular statistics gathering operation, then block 550 may be performed before block 540 for the first performance of block 550 for the particular operation. Otherwise, block 540 is performed before block 550 for each subsequent performance of block 540 for the particular operation.

As noted previously, a partitioned table may be maintained in incremental mode. In an embodiment, if a table is maintained in incremental mode, then a computer job to gather "global" statistics (i.e., for the entire table) is not initiated until statistics have been gathered for each partition of the table. If a table is not maintained in incremental mode, then a computer job to gather "global" statistics (i.e., for the entire table) may be run concurrently with one or more computer jobs that are gathering statistics for one or more partitions of the table.

Histograms

A histogram is one type of statistic that may be gathered for a database object or a portion thereof, such as a table or a column of a table. A histogram indicates a distribution of values in a database object. A distribution of values may be uniform, meaning that there is roughly the same number of each distinct value in a plurality of values. For example, if a column contains only values 1, 1, 2, 2, 3, 3, 4, and 4, then the distribution is uniform. The number of distinct values in this set is four and the frequency of each distinct value is two.

The accuracy of a histogram is important for selectivity estimation. If a query optimizer checks a histogram to determine a selectivity of a particular value in a query and the histogram is not accurate regarding the frequency of the particular value, then the query optimizer might select a suboptimal execution plan.

Frequency Histogram

A histogram may be implemented in one of multiple ways. One type of histogram is a "frequency" histogram that indicates, for each distinct value in a set, a frequency of that distinct value. Each distinct value-frequency pair is referred to as a bucket. Thus, a frequency histogram has the same number of buckets as there are number of distinct values. The buckets or distinct values in a frequency histogram may be sorted based on their respective bucket value.

Height-Balanced Histogram

Another type of histogram is referred to as a "height-balanced" histogram. A height-balanced histogram is one that includes a number of buckets that is less than the number of distinct values. For example, if there are ten buckets and a hundred distinct values, then a height-balanced histogram is created. Each bucket in a height-balanced histogram corresponds to the same number (or roughly the same number) of values. For example, if there are seven values and three buckets, then two buckets will correspond to two values and another bucket will correspond to three values.

A height-balanced histogram indicates, for each endpoint of the bucket, a particular value that corresponds to or belongs to the bucket. A bucket has two endpoints. Each bucket may share at least one endpoint with another bucket. For example, if the values in a column are 1, 2, 2, 2, 2, and 3 and there are two buckets, then values 1, 2, and 2 belong to the first bucket and values 2, 2, and 3 belong to the second bucket. The left endpoint of the first bucket indicates '1', the right endpoint of the first bucket and the left endpoint of the second bucket indicate '2', and the right endpoint of the second bucket indicates '3.' Thus, three values may be used to represent six values in the column. When the number of distinct values in a column is significantly larger than the number of buckets in a histogram, then the histogram will contain a small number of distinct values relative to all the distinct values in the column.

One aspect of height-balanced histograms is that "frequent" values are associated with multiple buckets. For example, if the values in a data set are 1, 2, 2, 2, 2, 2, 2, 3, 3, and 4, and there are three buckets, then the first bucket will have endpoints '1' and '2', the second bucket will have endpoints '2' and '2', and the third bucket will have endpoints '2' and '4'. In other words, in height-balanced histograms, frequent values "spill over" into many buckets.

Figure 6A:
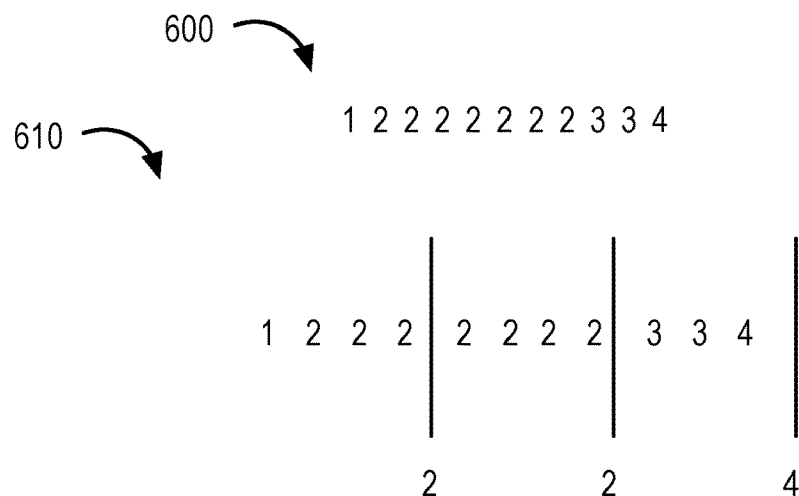
FIG. 6A is a block diagram that depicts an example height-balanced histogram based on a data set.

FIG. 6A is a block diagram that depicts an example height-balanced histogram 610 based on a data set 600, where the number of buckets is three. FIG. 6A also includes values 612 that correspond to the bucket endpoints. Values 612 include 1, 2, 2, and 4. Height-balanced histogram 610 is not completely accurate because the value '3' is not reflected even though there are twice as many '3's as there are '1's and '4's. Also, height-balanced histogram 610 implies that value '2' is only twice as frequent as values '1' and '4' when value '2' is six times as frequent as values '1' and '4'. Additionally or alternatively, because '2' is an endpoint of two buckets out of three total buckets, it is presumed that ⅔ of the entire data set consists of 2s. Thus, out of 11 total values, the number of 2s is 11*⅔~7. On the other hand, '1' and '4' may be labeled as non-popular (since they do not appear as an endpoint in two or more buckets); thus, another measure (e.g., "density") may be used for them, such as (11-7)*⅓~1.

Hybrid Histogram

In an embodiment, a hybrid histogram is generated and is based on a feature of frequency histograms and a feature of height-balanced histograms. Specifically, a hybrid histogram combines a space-savings feature of height-balanced histograms with the accuracy of frequency histograms, at least for more popular values.

A hybrid histogram includes a number of buckets, one or more (or each) of which is associated with frequency information. The frequency information of a bucket may be a frequency number for one or both endpoints of the bucket. For example, if a value spans multiple buckets, then the value is "collapsed" such that a single bucket indicates a frequency of that value. In this way, frequent values do not "spill over" into other buckets, as is the case for height-balanced histograms.

In a related embodiment, the frequency information of a bucket may be a cumulative frequency number that indicates a total number of values that either precede the bucket or are included in the bucket. Thus, if a data set includes values 1, 2, 2, 2, 2, 2, 2, 3, 3, 3, and 3 and there are two buckets, then (1) the second endpoint of the first bucket may indicate (a) '6' indicating that there are six '2s' and (b) '7' indicating that there are seven values in the first bucket and (2) the second endpoint of the second bucket may indicate (a) '4' indicating that there are four '3s' and (b) '11' indicating that there are eleven values combined in the first and second buckets.

In a related embodiment, a bucket includes both types of frequency information: distinct frequency information regarding the number of instances of a particular value that "falls" into that bucket and cumulative frequency information regarding the total number of values either in that bucket or in preceding buckets.

Figure 6B:
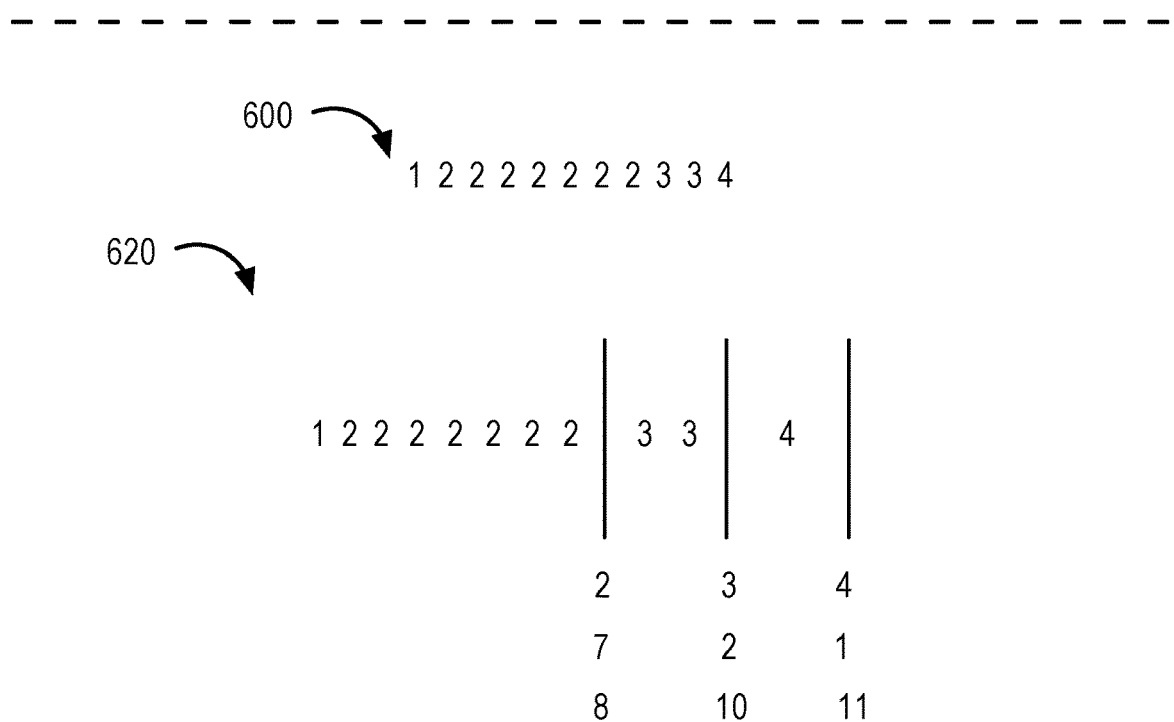
FIG. 6B is a block diagram that depicts an example hybrid histogram that is based on the same data set, in an embodiment.

FIG. 6B is a block diagram that depicts an example hybrid histogram 620 that is based on data set 600, in an embodiment. Hybrid histogram 620 contains more information than height-balanced histogram 610 in at least three ways: hybrid histogram 620 contains frequency information (i.e., '1', '7', '2', and '1') for each distinct value, hybrid histogram 620 indicates the value '3' as an endpoint, and hybrid histogram 620 contains cumulative frequency information (i.e., '8', '10', and '11') for multiple endpoints.

In an embodiment, frequency information is only maintained for values (e.g., '2' in hybrid histogram 620) that would have otherwise "spilled over" into other buckets under the height-balanced approach. Also, in an embodiment, if frequency information is not maintained for a bucket endpoint, then the lack of frequency information indicates that the frequency of the distinct value for that bucket endpoint is one or some other value or range of values, such as "less than 3."

In an embodiment, the number of buckets in a hybrid histogram that are eventually used may be less than the original bucket number for the hybrid histogram. This is due to the "collapsing" feature of hybrid histograms where all instances of a distinct value are assigned to a single bucket. In the case of hybrid histogram 620, the value '4' may have also been assigned to the second bucket (along with the two '3' values) and the last bucket is removed.

In an embodiment, instead of reducing the number of buckets, the remaining values to be assigned to buckets may be "spread out." For example, in FIG. 6B, after assigning the '2' values to the first bucket, the number of remaining values (i.e., three) is divided by the number of remaining buckets (i.e., two) to obtain a different distribution. Originally, there were ten values and three buckets, which meant that each bucket might have at least three values. However, due to all the '2' values being assigned to the first bucket, the remaining buckets will have at most two values. FIG. 6B is an example of this embodiment.

Top-Frequency Histogram

In an embodiment, instead of automatically using a hybrid histogram approach if the number of buckets in a histogram is less than the number of distinct values, a further determination is performed. The determination is regarding how representative the top N (N being the number of buckets) most frequent distinct values in a data set are relative to all values in the data set. For example, if the top N most frequent distinct values represent a particular percentage (e.g., 99%) of the values in a data set, then a frequency histogram is created and other "infrequent" distinct values are not important enough to be represented in the frequency histogram. The respective frequencies of the other "infrequent" distinct values can be assumed to be relatively small, such as one or ten, depending on the size of the data set. Thus, the created frequency histogram may exclude information (e.g., buckets) about any distinct values that are not considered "frequent enough." Thus, if N is 50 and the number of distinct values is 75 and the top 50 most frequent distinct values represent at least the particular percentage (e.g., 99%) of all values in the data set, then a top frequency histogram includes 50 buckets, one for each of the top (in terms of frequency) 50 distinct values.

The percentage representative value (i.e., 99% in the example above) may be a default value. Additionally or alternatively, the percentage representative value may be set by a user, such as a DBA. Additionally or alternatively, the percentage representative value may be determined based on an equation that takes, as input, the number of buckets and produces, as output, a "percentage representative value." An example of such an equation is: percentage representative value=$[1-(1/N)]*100$.

If it is determined that the top N distinct values in a data set represent less than the percentage representative value of all distinct values in the data set, then a hybrid histogram is chosen in order to store the frequency information.

Figure 7:
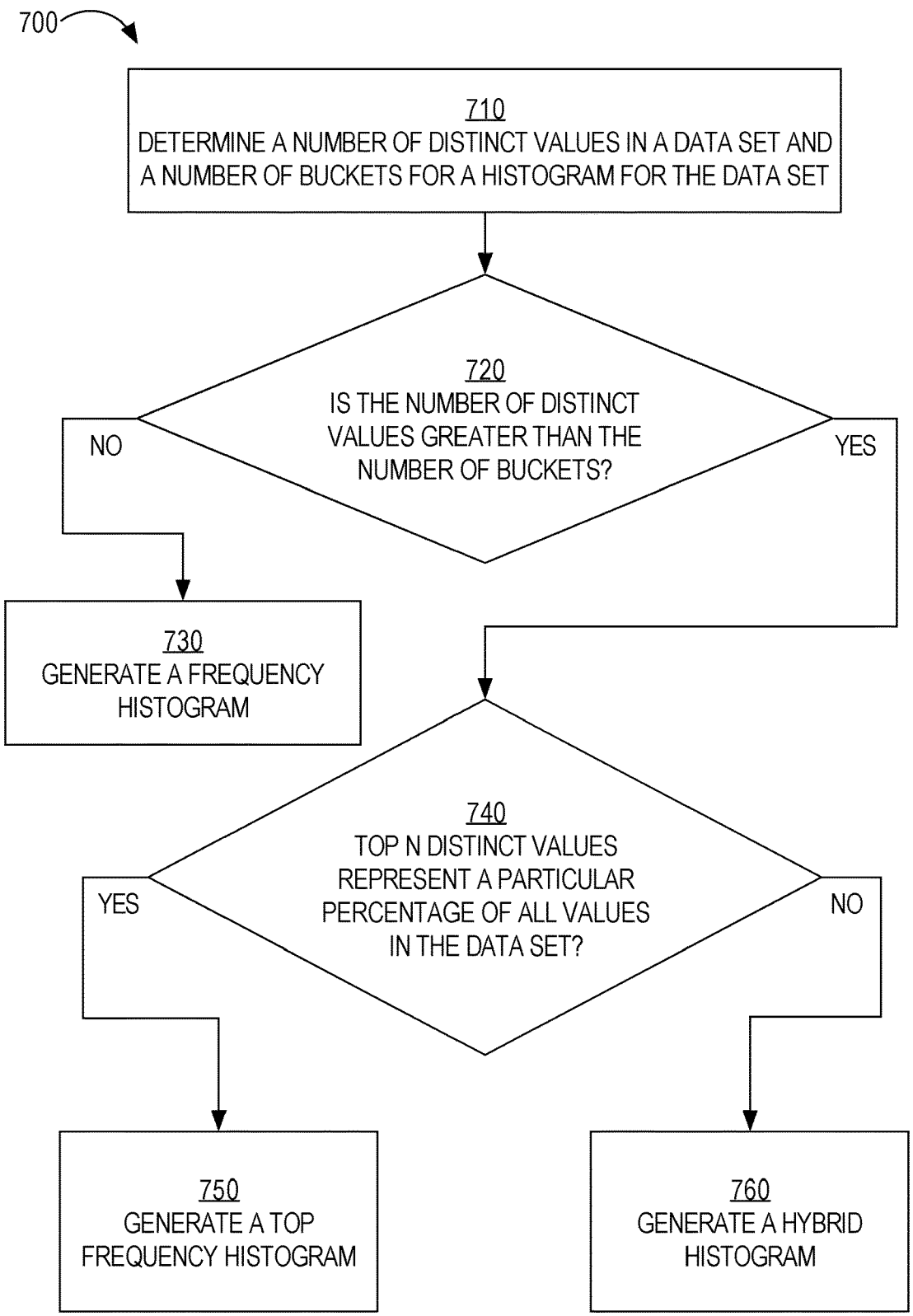
FIG. 7 is a flow diagram for determining which type of histogram to generate, in an embodiment.

FIG. 7 is a flow diagram 700 for determining which type of histogram to generate, in an embodiment. At block 710, a number of buckets is determined and a number of distinct values in a data set is determined.

At block 720, it is determined whether the number of distinct values is greater than the number of buckets. If not, then process 700 proceeds to block 730 where a frequency histogram is generated based on the data set. If so, then process 700 proceeds to block 740.

At block 740, it is determined whether the top N distinct values represent a certain percentage of all values in the data set. N may be equal to the number of buckets or some other number, whether default or selected by a user. If the determination in block 730 is positive, then process 700 proceeds to block 750 where a top frequency histogram is generated. Otherwise, process 700 proceeds to block 760 where a hybrid histogram is generated.

Non-Sampling-Based Histogram

One approach for building a histogram from a data set is by sampling the data set. A data set, such as a column of a table, may be sampled dynamically (i.e., during compilation of a query for which the histogram will be used) or statically, when no query optimizer is requesting a histogram on that data set. Sampling involves reading a portion (e.g., 10%) of the data set and inserting the read portion into a temporary table. The temporary table is then analyzed to gather statistics, including a histogram. However, such an approach may result in inaccurate histograms, especially if the sampled data is not representative of the entire population of values for which the histograms were generated.

In an embodiment, a full (or nearly full) scan of a data set is performed. A hash table is created where the size of the hash table is a limited size. The number of entries in the hash table may be the number of buckets for a histogram or some other value that may be a default value or a value set based on user input. Each entry in the hash table corresponds to a different distinct value. For each scanned data element or value in the data set, a hash value is generated based on the scanned value and the hash value is used to lookup a position in the hash table.

Each entry in the hash table indicates a frequency value that indicates a number of times a distinct value that maps to that entry has been read and used to lookup that entry. Initially, each entry in the hash table is empty or contains a '0' value, indicating that a distinct value that maps to that entry has not been processed yet. If an entry is identified based on a hash value, the frequency value is incremented.

In some cases, two or more distinct values may hash to the same entry in the hash table. To account for this possibility, an entry may include multiple distinct value-frequency value pairs.

A data set (such as all the values in a column of a table) is divided into multiple windows, where each window corresponds to a certain number of values or rows, such as 10,000. After scanning the data that corresponds to a window, a determination is made. The determination involves determining whether there are any "infrequent" items or distinct values in the hash table. An infrequent distinct value is one that has a frequency less than M. M may be a default value or a value established by a user. An infrequent distinct value is one that may not be worth storing histogram data for. Data in the hash table for each infrequent distinct value is deleted or removed.

A second window of the data set is scanned. During the second scan, if a scanned value is found in the hash table, then the corresponding frequency value is incremented. If a scanned value is not found in the hash table, then a frequency value for that value is set to M+1. One reason for adding M to the frequency of each "new" value is that it is assumed that the value may have been considered infrequent in the previous window and may have had a frequency of M. After the second window is scanned, a scan for and deletion of infrequent distinct values is performed. An infrequent distinct value at this stage may be one that has a frequency that is less than P, which may be greater than M, such as 2*M.

This process repeats for one or more additional windows. However, instead of adding M to the frequency value for hash entries that are empty, a greater value (e.g., 3*M for the third window or 4*M for a fourth window) may be added.

In an embodiment, the non-sampling approach is used to generate a frequency or top frequency histogram while a sampling approach is used to generate a hybrid histogram.

Dynamic Statistics

Having accurate statistics for predicates in a query is important for selecting an optimal execution plan. A typical approach for computing statistics for predicates is to use a statistical model whose accuracy varies widely depending on the complexity of the predicates, i.e., the error rate is unbounded for complex predicates. As mentioned herein, an alternative approach for gathering such statistics is to execute fragments of the user query during query optimization using a sample of the table data, hence the name "dynamic sampling." Dynamic sampling is a process of sampling data from a database object in order to generate statistics that may be used to estimate a cost of an execution plan for a query. A dynamic sampling query is a simple SQL statement computing simple aggregates such as COUNT(*), such as:

```
SELECT count(*)
FROM emp sample(%)
WHERE (sal > 100K and bonus > 10K)
```

The "%" refers to a percentage of the table 'emp' that is analyzed, which percentage may be, for example, 1, 5 or 10. If a query that is being optimized by a query optimizer includes multiple predicates, then the query optimizer may issue a dynamic sampling query for a subset of the predicates.

A disadvantage to dynamic sampling is the DBA has to explicitly set a configuration parameter to enable it for a query and specify the sample size.

Another disadvantage to dynamic sampling is that dynamic sampling only works for single table predicates. However, many predicates involve joins and estimating the cardinality of joins may be very difficult. Another limitation is that dynamic sampling cannot be used to estimate the number of rows returned by a GROUP BY operation.

Another disadvantage to dynamic sampling is that it may be very inefficient and wasteful in certain situations. For example, a query may be transformed multiple times during a query optimization phase. At each transformation phase, the query optimizer may issue multiple dynamic sampling queries, one for each single table predicate in the transformed query. However, many of the dynamic sampling queries are repeated because subsequent transformation phases did not see results of dynamic sampling queries from previous transformation phases.

Another disadvantage to dynamic sampling is that it may be very wasteful in case the application queries shares many of the processing or are similar except for minor details. For example, the same query can be repeated with a predicate using today's data instead of yesterday's date.

Dynamic Statistics for Expensive Queries

Dynamic sampling is one source of dynamic statistics. Other sources of dynamic statistics include statistics gathered during execution of a previous query (e.g., by a statistics collector) and information about database objects involved in a query, such as an amount or number of changes to a database object since the last time statistics were gathered for the database object and/or a change in size of the database object since the last statistics gathering time.

Examples of information about changes to a database object (e.g., table) is a number of data items (e.g., rows) that were inserted into the database object, a number of data items that were modified in the database object, and a number of data items that were deleted or removed from the database object. Such information may be maintained for every DML (data manipulation language) statement that is submitted and processed.

In an embodiment, dynamic statistics are generated for and maintained for certain queries that are considered "expensive" based on past executions of an execution plan. An "expensive" query may be determined based on one or more factors. Example factors include time that lapsed to execute the execution plan and a number or amount of computer resources that were required to execute the execution plan (e.g., number of rows processed, CPU utilization, memory utilization, disk I/O utilization).

Thus, dynamic statistics may be gathered during compilation and execution of a query and later, after execution of the query, it is determined whether some or all of the dynamic statistics will be stored for later use. If it is determined that the query (or a portion thereof) is "expensive," then the generated dynamic statistics (or a portion thereof) may be stored in (or in association with) a cursor for the query and/or in association with one or more database objects that were involved in execution of the query.

In an embodiment, a budget is determined for an expensive query. The budget may be expressed as a percentage of, for example, the most recent execution time of the query, an average of past execution times of the query, or the median past execution time. For example, a default budget may be 2%, meaning 2% of a past (or most recent) execution time is devoted to processing dynamic statistics, which may include gathering the dynamic statistics. If the past execution time is two hundred seconds, then the budget may be four seconds.

Storing Dynamic Statistics

In an embodiment, dynamic statistics are stored persistently in a shared memory structure that is available to different database sessions. In this way, many different queries may leverage the dynamic statistics in order to make as intelligent query optimization decisions as possible. Dynamic statistics for an operation that was performed during execution of an execution plan may indicate one or more of the following: the type of operation (e.g., filter, scan, join, group-by), the one or more database objects that were involved in the operation (e.g., tables T1 and T2), any predicates that were applied (e.g., c1>20 and c3=4), the selectivity of one or more values, the number of data items that were read (e.g., 1034 rows) from each database object, the number of data items that resulted from the operation (e.g., 89 rows), and other statistics on the columns or expressions returned by different operations (e.g., the minimum, maximum, and number of distinct values of a column).

Shared dynamic statistics may be stored in multiple ways. In one way, dynamic statistics are stored in memory in the form of a data structure that involves a hash table or stored in persistent storage such as flash or disk. A database object for which dynamic statistics have been gathered is associated with an identifier. A database object identifier may be used as input to a hash function. The output of the hash function is a position in the shared data structure (e.g., an array or a hash table). The entry at the position may identify the database object and contains statistics for the database object, including (e.g., time) information regarding when the statistics were gathered and/or last used. If dynamic statistics are based on multiple database objects, such as a join of two tables, then the identifiers of the multiple database objects may be combined and input into the hash function to identify a position in the shared data structure. The entry at the position may identify the multiple database objects and contains statistics for the multiple database objects. Alternatively, the dynamic statistics may be stored in multiples entries: one for each of the multiple (e.g., two) database objects.

Thus, optimization of a first query may initiate the creation of a first set of dynamic statistics, which are stored in shared memory. Later, a second query is received, which may have been issued in the same or different session as the first query. The second query may be very different than the first query. A query optimizer determines whether any constructs, predicates, etc. in the second query are found in the shared memory. For example, if the first query includes a join of two tables, one of which has a predicate applied to it, then dynamic statistics may be stored about the cardinality of the join. If the second query also includes the same join with the same predicate on the appropriate table, then a query optimizer identifies the statistics on the cardinality of the join in order to determine an estimated cost of executing an execution plan that involves the join. The dynamic statistics are stored in a way that makes the lookup or matching insensitive to the user of upper or lower case, table aliases, column aliases, the order of the tables in the FROM clause, the order of the predicates in the WHERE clause, etc.

Dynamic Statistics and Cursor Sharing

In an embodiment, dynamic statistics are used to determine whether to share cursors (execution plans) or create a new one. When a query is received, the query may be compared to queries associated with multiple cursors. Multiple cursors may be based on the same query or equivalent queries, such as queries that are identical except for bind values.

Many tests may be performed to determine whether a cursor may be shared with a subsequent query. In an embodiment, one test is determining whether a database object required by the query has changed significantly over time, such as since the most recent usage of the cursor or since the last time statistics were gathered on the database object. If so, then the cursor is not shared or used for executing the query.

Determining whether a database object has changed significantly may be based on one or more factors. Example factors include a number of data items (in the database object) that have been modified, added, and/or deleted over a period of time and the size of the database object. For example, if the size of a table was 200 MB when the cursor was last used and the size of the table is now 900 MB, then the cursor is not shared. As another example, if the number of rows that have been modified in a table is over 40% of the table, then the cursor is not shared.

A heuristic may be used to determine whether a database object has changed enough. An example heuristic is 10%; thus, if the size of a table has increased or decreased at least 10%, then the cursor is not shared. The heuristic may be hard-coded or tunable by a user, such as a DBA.

In order to determine whether a database object has changed significantly, "snapshot data" may be stored. The snapshot data may indicate a size (e.g., in the number of rows in a table or number of storage blocks required to store the table) at a particular time, such as a time when the cursor was used to execute a query against the database object of when the snapshot data was generated. The snapshot data may be stored, for example, in the cursor, in a (e.g., table) definition of the database object, which is retrievable by queries in multiple sessions, or in another shared data structure, such as a hash table or array.

Also, "current data" may be stored in order to determine whether a database object has changed significantly. Current data may be the same type of data as the snapshot data so that the current data may be compared to the snapshot data.

Figure 8:
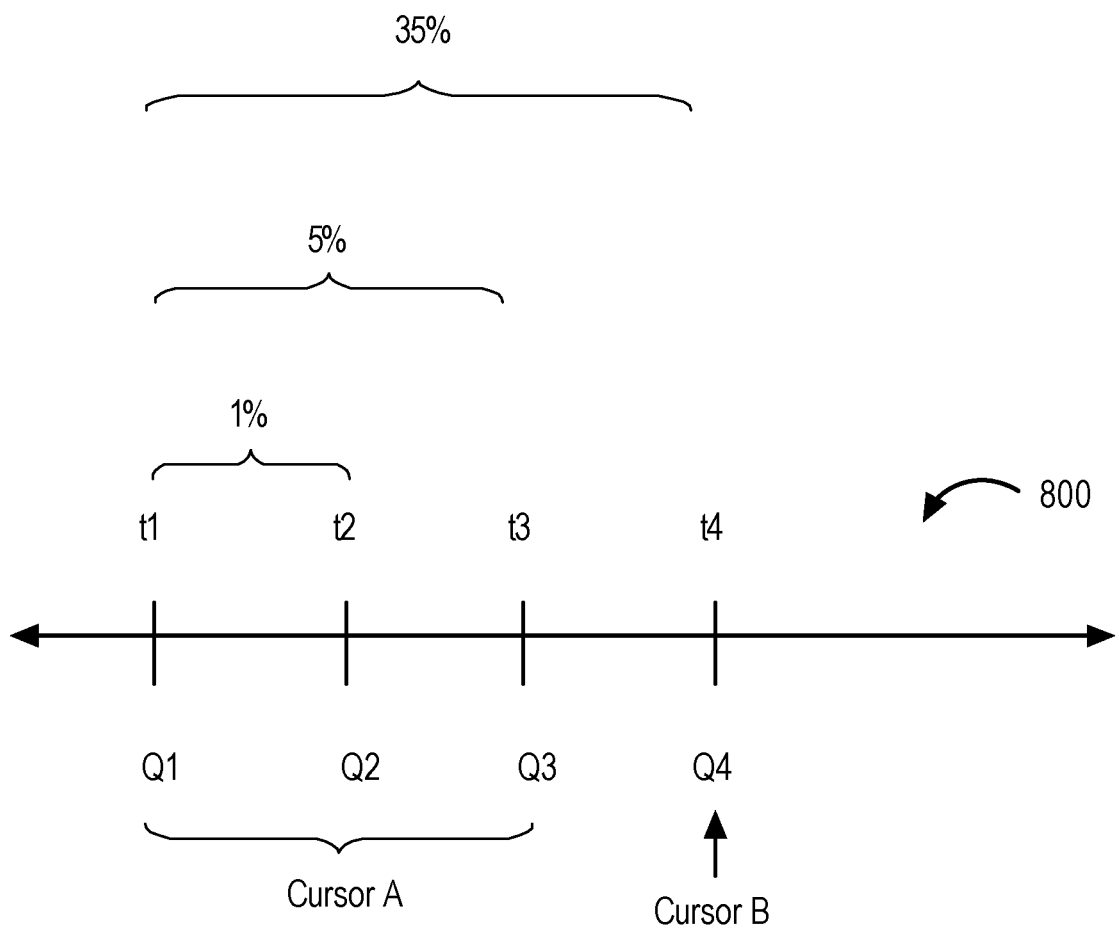
FIG. 8 is a block diagram that depicts an example timeline 800 of when multiple queries that can share the same cursor are submitted, in an embodiment.

FIG. 8 is a block diagram that depicts an example timeline 800 of when multiple instances of a query (or instances of equivalent queries that can share the same cursor) are submitted. At time t1, query Q1 is submitted and a cursor ("cursor A") is generated therefrom.

At time t2, query Q2 that can use cursor A is submitted. Since time t2, a particular table that the cursor targets has increased 1%, which may be below a change threshold (which may be applicable to only that particular table, to multiple database objects, or to all database objects). Because the change in size is less than the change threshold, cursor A is used for Q2.

At time t3, query Q3 that can use cursor A is submitted. Since time t1, the particular table has increased 5%, which may also be below the change threshold. Because the change in size is less than the change threshold, cursor A is used for Q3.

At time t4, query Q4 that can use cursor A is submitted. Since time t1, the particular table has increased 35%, which may be above the change threshold. Because the change in size is greater than the change threshold, the cursor is not used for Q4. Instead, a new execution plan and, therefore, a new cursor ("cursor B") is generated.

In an embodiment, if (1) a query is compiled (or "hard parsed") after determining that a cursor should not be used based on the amount of changes to one or more database objects targeted by the cursor and (2) the execution plan that results from the hard parse is an execution plan that is identical to the execution plan associated with the cursor, then the change threshold associated with the cursor (or with the database object(s)) is increased. For example, if a change threshold is 20%, a table decreased in size by 25%, and an identical execution plan was generated, then the change threshold may be changed to 30%. The change threshold may be associated with table and/or with the cursor. An initial change threshold may be a default value or user-specified value that is applied to all cursors or database objects. Over time, change thresholds for some cursors or database objects may increase.

In an embodiment, the time (or one or more computer resources) required to process a query that is "sharing" a cursor is compared to a time for processing a previous query that used the cursor. If the difference is significant, then the change threshold for the cursor (or for a database object that targeted by the query) is decreased. For example, if it took one minute to execute an execution plan of a particular cursor and later it took three minutes (or 3× the previous execution) to execute the execution plan, then the change threshold for the cursor decreases from 10% to 5%. Such a decrease is to reflect the fact that the change threshold for certain cursors or database objects may be too large and that cursors are being shared too liberally. Such a decrease in the change threshold for a cursor or a database object will more likely result in fewer instances of cursor sharing with respect to that cursor or cursors that target that database object.

Figure 9:
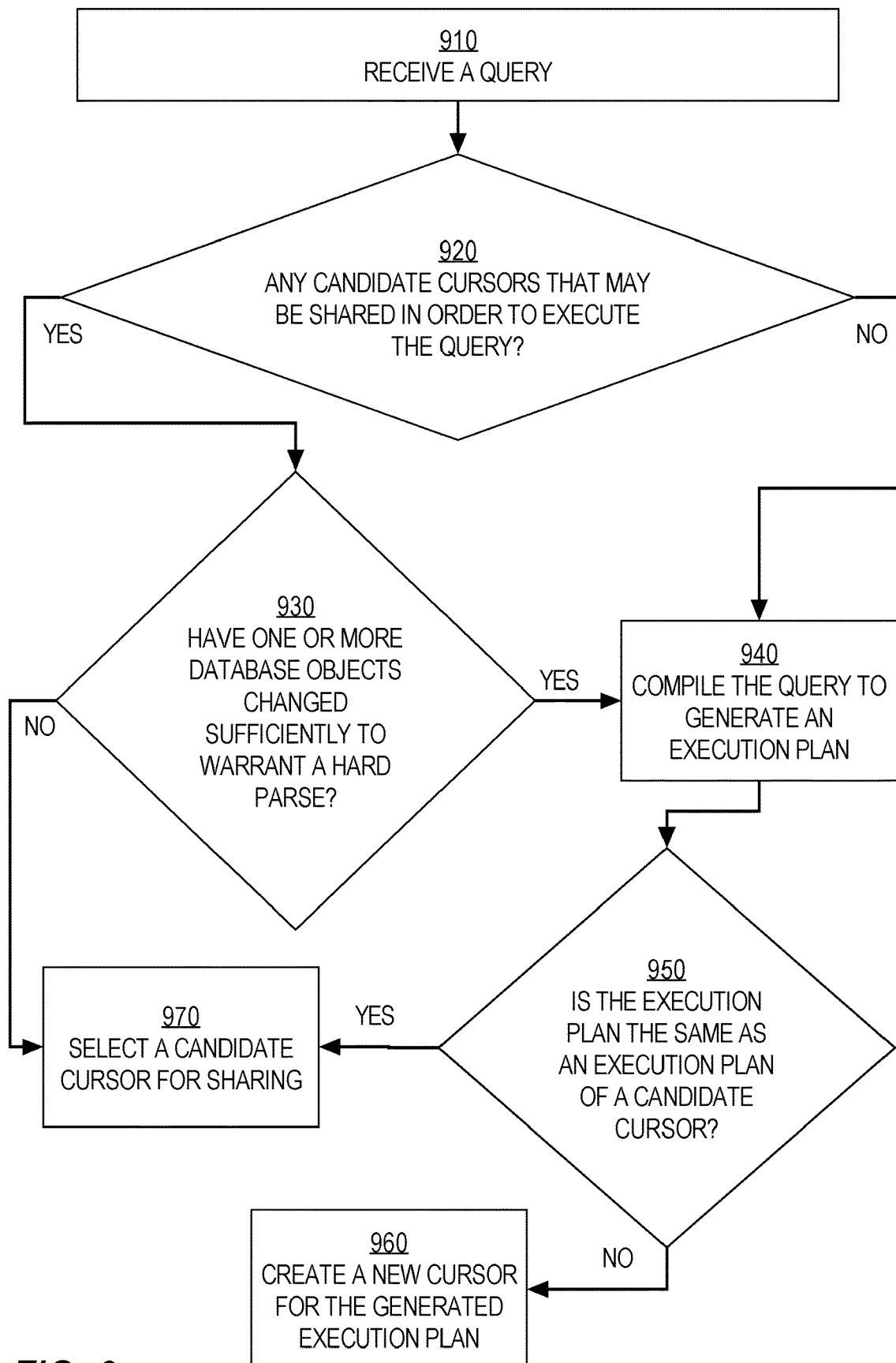
FIG. 9 is a flow diagram that depicts a process for sharing a cursor, in an embodiment.

FIG. 9 is a flow diagram that depicts a process 900 for sharing a cursor, in an embodiment. At block 910, a query is received. The query may conform to a database language, such as SQL.

At block 920, it is determined whether there are any candidate cursors that may be shared in order to execute the query. If so, then process 900 proceeds to block 930. Otherwise, process 900 proceeds to block 940. Block 920 may involve comparing the query received in block 910 with the query associated with each cursor to determine whether there are any queries that are the same as or equivalent to the received query. At block 920, multiple candidate cursors that may be shared may be identified. One reason different cursors might exist for equivalent queries is because different equivalent queries may have different bind values that necessitate a much different execution plan. For example, a first query may have an equality predicate that results in many rows while an equivalent second query may have an equality predicate that results in few rows. Thus, an execution plan for the first query may involve a scan operation while an execution plan for the second query may involve accessing an index, depending on the bind values.

At block 930, it is determined whether one or more database objects (that are a target of the query) have changed sufficiently to warrant a hard parse. If so, process 900 proceeds to block 940. Otherwise, process 900 proceeds to block 970. Block 930 may comprise of one or more other checks or determinations that are unrelated to how much a database object has changed or been modified. Those other checks are not described here.

At block 940, a hard parse is performed on the query, which results in an execution plan. At block 950, it is determined whether the execution plan is the same as an execution plan of a candidate cursor identified in block 920. If so, then process 900 proceeds to block 970. Otherwise, process 900 proceeds to block 960.

At block 960, a cursor is created for the execution plan generated at block 940 and the execution plan is executed.

At block 970, a candidate cursor from among the candidate cursor(s) identified in block 920 is selected for cursor sharing and the execution plan of the candidate cursor is executed.

In an embodiment, dynamic statistics (e.g., information about changes to a database object) may be maintained or tracked at various levels of granularity. For example, change information may be at the table level and/or at the column level. If a column of a table has changed significantly (or the values in the column have changed significantly) but the column is not relevant to a query, then information on that column is not used to determine whether a cursor may be shared for that query. Thus, if a particular column of the table has not changed significantly, then a cursor that targets the particular column is a more likely candidate for cursor sharing than if the particular column had changed significantly.

In an embodiment, dynamic statistics change information may only be maintained for database objects or portions of database objects (e.g., columns) that are accessed "frequently" (e.g., at least once per day) by a query processor(s). For example, if a column of a table is not accessed more than once per day, then change information is not maintained for that column.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    generating statistics about an operation in a first execution plan (1) that involves a plurality of operations that includes the operation and (2) that is executed for a first query and that references a database object;
    determining an estimated performance of execution of the operation for the first query;
    determining an actual performance of the execution of the operation;
    determining a difference between the estimated performance and the actual performance;
    based on a magnitude of the difference between the estimated performance and the actual performance, determining whether to store the statistics, wherein the statistics do not include statistics for any other operation in the plurality of operations;
    in response to determining to store the statistics, storing, in association with the database object and the operation, the statistics that indicate information about the operation;
    after storing the statistics and in response to receiving a second query that is not equivalent to the first query, determining whether the statistics are relevant to the second query;
    wherein determining whether the statistics are relevant to the second query comprises:
        identifying, in the second query, an indication of the database object and an indication of the operation; and
        based on the indication of the database object and the indication of the operation, identifying the statistics;
    in response to determining that the statistics are relevant to the second query, determining a second execution plan based on the statistics; and
    executing the second execution plan.

2. The method of claim 1, wherein the operation is a filter operation on the database object, wherein the filter operation includes a predicate that was applied to the database object.

3. The method of claim 1, wherein the operation is a join operation that involves the database object and one or more other database objects.

4. The method of claim 1, wherein:
    storing the statistics comprises storing the statistics separate from any cursor that is associated with the first execution plan; and
    identifying the indication of the database object and the indication of the operation is performed without examining any cursor that includes the first execution plan.

5. The method of claim 1, wherein the statistics are first statistics, the operation is a first operation, and the database object is a first database object, the method further comprising:
    generating second statistics about a second operation, in the plurality of operations, that involved one or more second database objects that includes a second database object;
    determining a second estimated performance of execution of the second operation;
    determining a second actual performance of the execution of the second operation;
    determining a second difference between the second estimated performance and the second actual performance;
    determining, based on a second magnitude of the second difference, whether to store the second statistics; and
    refraining from storing the second statistics for a subsequent query.

6. The method of claim 1, wherein determining the actual performance of the execution of the operation comprises determining a time that lapsed to execute the operation or determining a number or amount of computer resources that were required to execute the operation.

7. The method of claim 1, wherein identifying the statistics comprises:
    using an identifier of the database object to identify an entry in a data structure that comprises a plurality of entries, each entry in the plurality of entries containing certain statistics about one or more operations involving different database objects; and
    analyzing the entry to determine whether a particular join or a particular predicate in the second query matches, in the entry, a predicate or a join that is indicated in the first query.

8. The method of claim 7, wherein the entry indicates when the certain statistics were generated or last used.

9. The method of claim 7, wherein:
the operation is a filter operation that includes the predicate that is applied to the database object;
the particular predicate in the second query is one of a plurality of predicates in the second query;
the particular predicate is not the first predicate in the plurality of predicates; and
the method further indicating that the particular predicate in the second query matches the predicate indicated in the first query.

10. The method of claim 1, wherein the statistics include a first number of data items that were read from the database object and a second number of data items that resulted from the operation.

11. The method of claim 1, wherein the first execution plan cannot be used to generate valid results for the second query.

12. One or more storage media storing instructions which, when executed by one or more processors, cause:
generating statistics about an operation in a first execution plan (1) that involves a plurality of operations that includes the operation and (2) that is executed for a first query and that references a database object;
determining an estimated performance of execution of the operation for the first query;
determining an actual performance of the execution of the operation;
determining a difference between the estimated performance and the actual performance;
based on a magnitude of the difference between the estimated performance and the actual performance, determining whether to store the statistics, wherein the statistics do not include statistics for any other operation in the plurality of operations;
in response to determining to store the statistics, storing, in association with the database object and the operation, the statistics that indicate information about the operation;
after storing the statistics and in response to receiving a second query that is not equivalent to the first query, determining whether the statistics are relevant to the second query;
wherein determining whether the statistics are relevant to the second query comprises:
identifying, in the second query, an indication of the database object and an indication of the operation; and
based on the indication of the database object and the indication of the operation, identifying the statistics;
in response to determining that the statistics are relevant to the second query, determining a second execution plan based on the statistics; and
executing the second execution plan.

13. The one or more storage media of claim 12, wherein the operation is (a) a join operation that involves the database object and one or more other database objects or (b) a filter operation on the database object, wherein the filter operation includes a predicate that was applied to the database object.

14. The one or more storage media of claim 12, wherein:
storing the statistics comprises storing the statistics separate from any cursor that includes the first execution plan; and
identifying the indication of the database object and the indication of the operation is performed without examining any cursor that includes the first execution plan.

15. The one or more storage media of claim 12, wherein the statistics are first statistics, the operation is a first operation, and the database object is a first database object, wherein the instructions, when executed by the one or more processors, further cause:
generating second statistics about a second operation that involved one or more second database objects that includes a second database object;
determining, based on one or more criteria, whether to store the second statistics; and
in response to determining that the one or more criteria are not satisfied, refraining from storing the second statistics for a subsequent query.

16. The one or more storage media of claim 12, wherein the instructions, when executed by the one or more processors, further cause:
storing execution time data that indicates a time to execute the first execution plan; and
determining, based on the execution time data, an amount of time to devote to processing dynamic statistics that includes the statistics.

* * * * *